(12) United States Patent
Chen et al.

(10) Patent No.: US 12,553,274 B2
(45) Date of Patent: Feb. 17, 2026

(54) DRIVING DEVICE

(71) Applicants: HSIN CHONG MACHINERY WORKS CO., LTD., Taoyuan (TW); FUZHOU MINGFANG AUTOMOBILE PARTS INDUSTRY CO., LTD., Fuzhou (CN)

(72) Inventors: Kai-Hsiang Chen, Taoyuan (TW); Chih-Ta Hou, Taoyuan (TW); Chi-Dah Chiang, New Taipei (TW)

(73) Assignees: HSIN CHONG MACHINERY WORKS CO., LTD., Taoyuan (TW); FUZHOU MINGFANG AUTOMOBILE PARTS INDUSTRY CO., LTD., Fuzhou (CN)

( * ) Notice: Subject to any disclaimer, the term of this patent is extended or adjusted under 35 U.S.C. 154(b) by 0 days.

(21) Appl. No.: 18/625,411

(22) Filed: Apr. 3, 2024

(65) Prior Publication Data

US 2024/0337147 A1    Oct. 10, 2024

Related U.S. Application Data

(60) Provisional application No. 63/457,795, filed on Apr. 6, 2023.

(51) Int. Cl.
*E05F 15/622* (2015.01)

(52) U.S. Cl.
CPC ......... *E05F 15/622* (2015.01); *E05Y 2201/70* (2013.01)

(58) Field of Classification Search
CPC ............................ E05F 15/622; E05Y 2201/70
(Continued)

(56) References Cited

U.S. PATENT DOCUMENTS

| 3,202,414 A | 8/1965 | Simmons et al. |
| 5,086,900 A | 2/1992 | Kikuta et al. |
| (Continued) | | |

FOREIGN PATENT DOCUMENTS

| CN | 105220980 A | 1/2016 |
| CN | 112443230 A | 3/2021 |
| (Continued) | | |

OTHER PUBLICATIONS

Search Report dated Aug. 26, 2024 of the corresponding European patent application No. 24168592.4.
(Continued)

*Primary Examiner* — T. Scott Fix
(74) *Attorney, Agent, or Firm* — HDLS IPR SERVICES; Chun-Ming Shih

(57) ABSTRACT

This disclosure is directed to a driving device for driving a swing member which has a driving power source, a power transmission assembly driven by the driving power source, a screw assembly and a clutch assembly arranged between the power transmission assembly and the screw assembly. The screw assembly has a nut and a screw rod screwed with each other. The screw rod has an end connected with the swing member. The nut can be operated by the clutch assembly to connected to or release the power transmission assembly. When the nut is connected to the power transmission assembly, the power transmission assembly is driven by the driving power source, so that the nut is driven by the power transmission assembly to move the screw rod and allow the swing member to be operated by an external force in any status during a power-driven operation of opening or closing.

38 Claims, 27 Drawing Sheets

(58) Field of Classification Search
USPC .......................................................... 74/89.38
See application file for complete search history.

(56) References Cited

U.S. PATENT DOCUMENTS 6,237,433 B1   5/2001  Rodrigues
10,655,378 B2  5/2020  Podkopayev

FOREIGN PATENT DOCUMENTS

DE  102019100827 A1  7/2020
EP       3828371 A1  6/2021
TW      200826429 A   6/2008
WO        9524534 A1  9/1995
WO    2021/019670 A1  2/2021

OTHER PUBLICATIONS

Office Action dated Oct. 4, 2024 of the corresponding Taiwan patent application No. 113110382.
Official action issued by European Patent Office in Jun. 27, 2025.

DRIVING DEVICE

CROSS-REFERENCE TO RELATED APPLICATION

This patent application claims the benefit of U.S. Provisional Patent Application No. 63/457,795, filed Apr. 6, 2023, which is incorporated by reference herein.

BACKGROUND

Technical Field

This disclosure is directed to a device used for driving a swing member to perform an open/close operation, in particular to a driving device having a clutch approach.

Related Art

A related-art open/close driving device is disclosed. The related art driving device has a swing member actuated by electric driven power to open and close relative to a main body. For example, the main body can be a transportation carrier, and the swing member is one of the doors installed on the transportation carrier. The related art driving device for opening and closing is connected to the main body through an additional hinge, and disposed with a motor configured to be a corresponding transmission mechanism for driving the hinged, so that the swing member can open and close relative to the transportation carrier with multiple related art hinges as a rotation axis thereof.

Although the related-art open/close driving device can open and close the swing member by electric driven power, a user cannot manually interrupt the operation at any status, namely that when the related-art open/close driving device is performing an operation of power-driven opening or closing, another operation should be performed after the operation is completed. For example, during a power-driven closing operation, if the user must open the swing member for emergency, a power-driven opening operation should be performed only when the power-driven closing operation is completed. Alternatively, the current operation may be shut by command (for example, key command) and then another operation can be performed. Accordingly, the user cannot interrupt the operation in any status.

In a power-driven operation of opening or closing is performed by the related-art open/close driving device, the related-art open/close driving device and mechanical structure therein tend to be damaged once the operation is interrupted by a reverse operation of an external force (such as manual force).

Furthermore, when the related-art open/close driving device directly pushes or pulls the swing member (the screw rod has one end connected to the hinge member of the main body) with the screw rod in the power transmission mechanism thereof, the screw rod cannot simply linearly output force to the swing member during the operation of opening or closing because the hinge member is not coaxial with the hinges of the related-art swing member, and sagging of the swing member relative to the main body may be caused by aging of the related-art hinge. The issues mentioned above may lead to shake on the screw rod and further lead to damage to the related-art open/close driving device and mechanical structure therein.

Moreover, even if the screw rod can be swung without damaging the internal mechanical structure, the power driving the swing member to open and close may not be transmitted smoothly to push or pull because an angular variation may occur between the teeth in the transmission mechanism meshed with each other.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

A purpose of this disclosure is to provide a driving device having a clutch approach that can be operated by external force at any status.

The second purpose of this disclosure is to provide a driving device has a power transmission assembly allowed to follow a screw rod to swing.

The third purpose of this disclosure is to provide a driving device that can prevent a transmission of power from a driving power source from failure caused by an angular variation of meshing occurred between the power transmission assembly and the driving power source.

In order to achieve the aforementioned purpose, this disclosure provides a driving device, used for driving a swing member, the driving device has a driving power source, a power transmission assembly, a screw assembly and a clutch assembly. The power transmission assembly is driven by the driving source. The screw assembly has a nut and a screw rod screwed with each other. The screw rod is defined with a length direction longitudinal direction and a radial direction perpendicular to the length direction longitudinal direction. The screw rod has one end used for connecting the swing member. The clutch assembly is disposed between the power transmission assembly and the screw assembly. The nut can connect to or release the transmission assembly power transmission assembly along the radial direction be passed through the clutch via the clutch assembly. When the nut is connected to the power transmission assembly, the transmission assembly power transmission assembly is driven by the driving power source drives, so that the nut is driven by the power transmission assembly to move the screw rod along the longitudinal direction.

Compared with the related art, this disclosure has the following effects: the power-driven operation of opening or closing the swing member is allowed to be interrupted by an external force at any status. In addition, the power transmission assembly is allowed to rotate following the swing of the screw rod relative to the housing, and a smooth power transmission of the driving power from the driving power source is ensuring even if an angular variation is occurred between the power transmission assembly and the driving power source changes due to the swing.

BRIEF DESCRIPTION OF THE DRAWINGS

FIG. 3-1 is a perspective view of the power transmission assembly of the first embodiment of this disclosure.

FIG. 10-1 is a cross-sectional view showing a nut and a portion of an engaging ring of the second embodiment of this disclosure.

DETAILED DESCRIPTION

Figure 1:
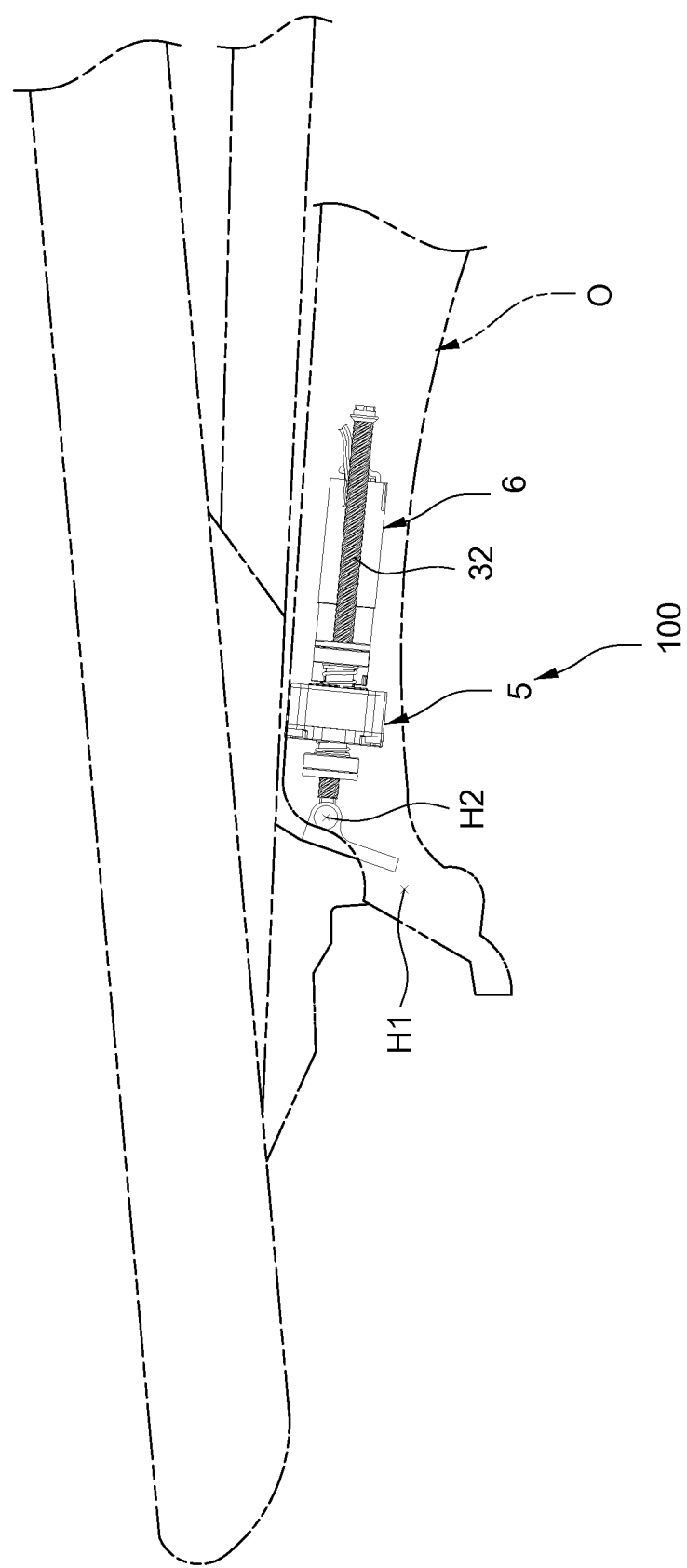
FIG. 1 is a perspective view showing the first embodiment of this disclosure which is installed on a swing member and the swing member is closed.

The technical contents of this disclosure will become apparent with the detailed description of embodiments accompanied with the illustration of related drawings as follows. It is intended that the embodiments and drawings disclosed herein are to be considered illustrative rather than restrictive.

This disclosure is directed to a driving device 100 as shown in FIGS. 1 to 6, which is used for driving a swing member O to open or close relative to a main body (not labeled in figures). This disclosure is directed to a driving device 100 having clutch function. The first embodiment is shown in FIGS. 1 to 8, the second embodiment is shown in FIGS. 9 to 17, and the third embodiment is shown in FIGS. 18 to 26. Specifically, for example, the main body may be a transportation carrier. The swing member O may be a door installed on the transportation carrier, for example. However, this application should not be limited to this.

First Embodiment

A driving device 100 according to the first embodiment as shown in FIGS. 1 to 8 has a power transmission assembly 1, a clutch assembly 2a, a screw assembly 3 and a driving power source 6.

Figure 6:
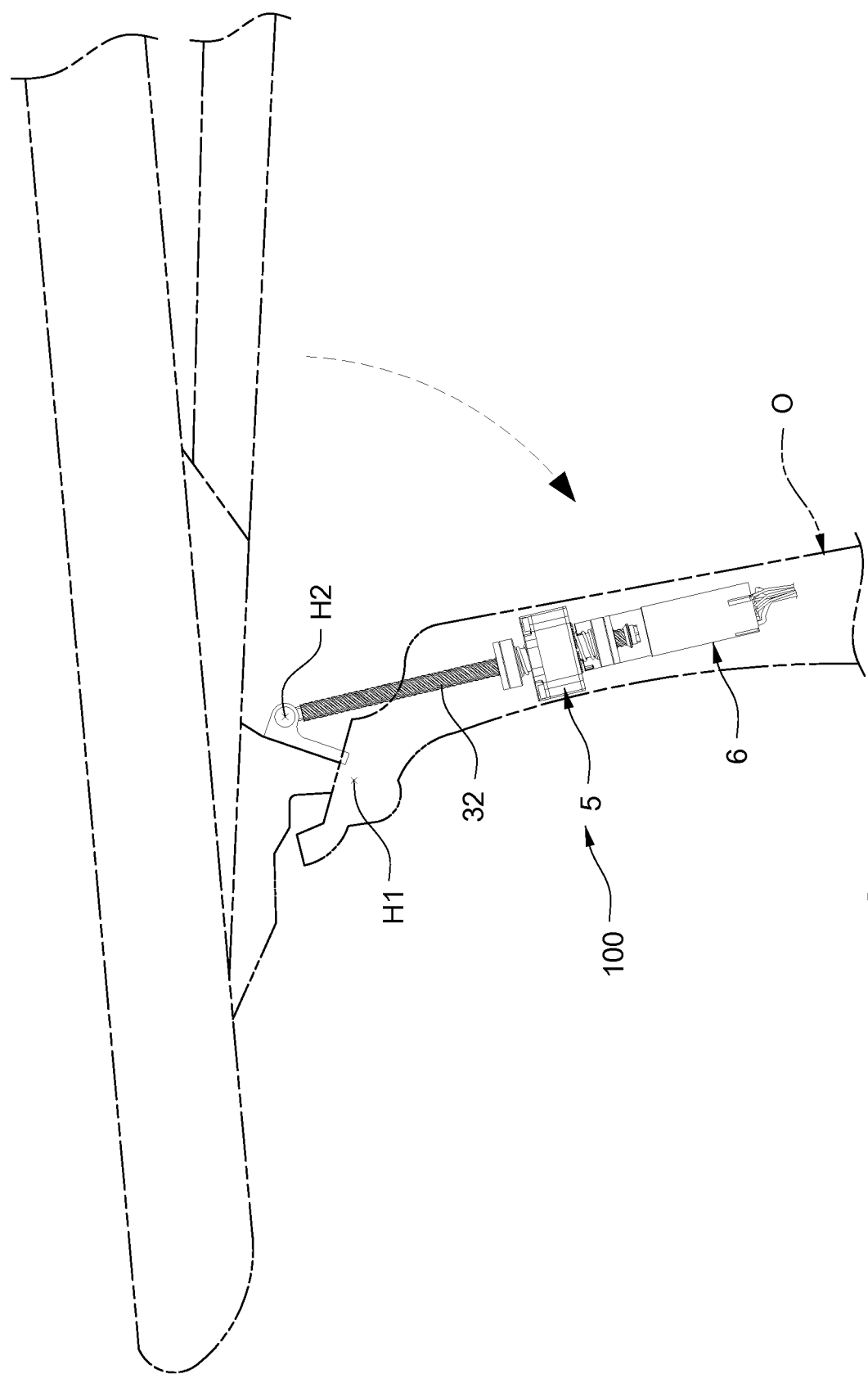
FIG. 6 is a perspective view of the power transmission assembly of the first embodiment of this disclosure when the swing member is opened.

It should be noted that, the driving device 100 of this disclosure may be arranged on the main body mentioned above (not shown in figures) and alternatively may be arranged on the swing member O. For a purposes of illustration, the driving device 100 is provided on the swing member O in this embodiment, for example. Specifically, the swing member O according to this embodiment is connected to the main body through a plurality of conventional hinges (not shown in the figures), and a rotating shaft (not shown in the figure) of the conventional hinge is defined with a first axis H1 as shown in FIGS. 1 and 6, the swing member O is rotatable relative to the main body about the first axis H1. The main body is provided with a conventional pivotal member, the pivotal member has a pivotal shaft, and the pivotal shaft is defined with a second axis H2 as shown in FIGS. 1 and 6.

The power transmission assembly 1 is driven by the driving power source 6 and capable of transmitting power from the driving power source 6 to the screw assembly 3. It should be noted that, in this application, it is not limited how to drive the power transmission assembly 1 and how to transmit, it may be performed by an approach as shown the figures or others.

Figure 2:
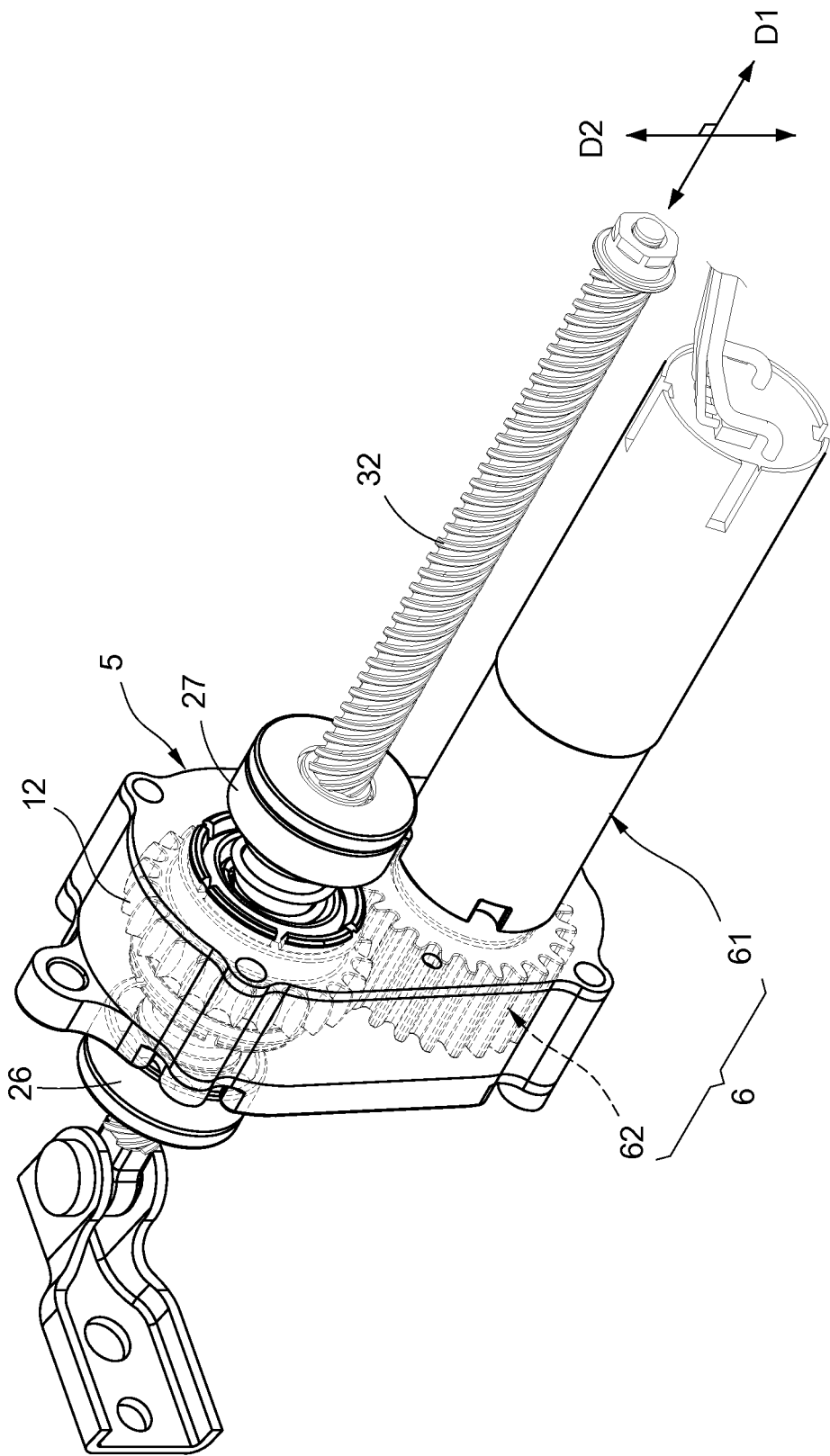
FIG. 2 is a perspective view showing the first embodiment of this disclosure.
Figure 3:
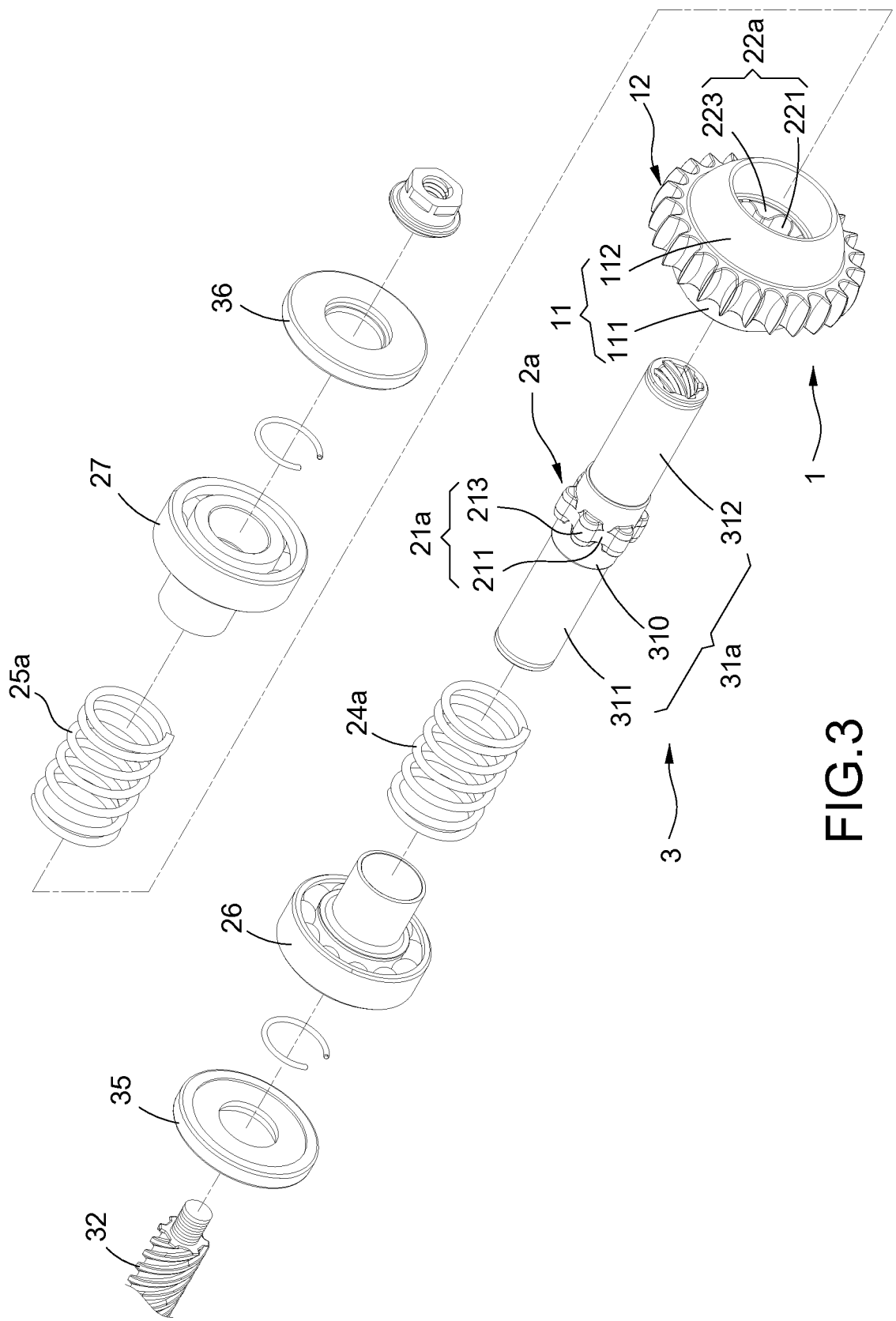
FIG. 3 is an exploded view of the first embodiment of this disclosure.

The screw assembly 3 has a nut 31a and a screw rod 32 screwed with each other, and the screw rod 32 in an initial status as shown in FIG. 2 is defined with a longitudinal direction D1 and a radial direction D2, and the longitudinal direction D1 is parallel to the screw rod 32. Specifically, the nut 31a is indirectly driven to rotate by the driving power source 6, so that the screw rod 32 can be extended or retracted along the longitudinal direction D1 relative to the nut 31a; the screw rod 32 has an end connected to the conventional pivotal shaft of the main body mentioned above (this pivotal shaft is defined with a second axis H2). It should be noted that, according to this embodiment, the first axis H1 and the second axis H2 mentioned above are disposed at different positions, namely not a co-axial arrangement, the screw rod 32 may be driven by power to extend or retract through this pivotal shaft, so that a moment about the first axis H1 will be generated, and the swing member O will be opened or closed by this moment. In addition, the nut 31a is not limited in this disclosure, it may be a thick ring (not shown in the figures) commonly used for screwing a bolt or an elongated tube as shown in FIG. 3, for example.

Figure 4:
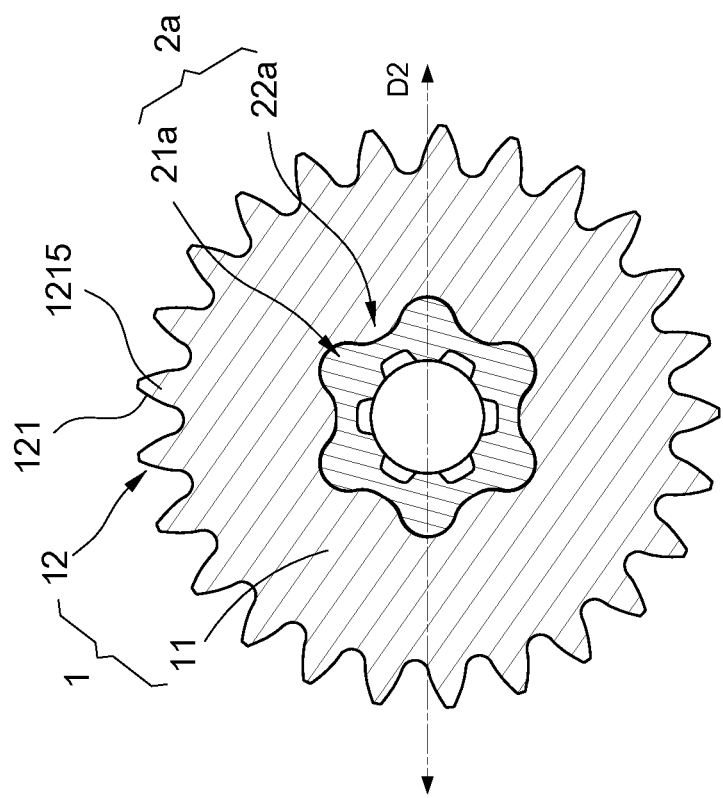
FIG. 4 is a side view showing a power transmission assembly, a screw assembly and a portion of a clutch assembly of the first embodiment of this disclosure.
Figures 1, 3:
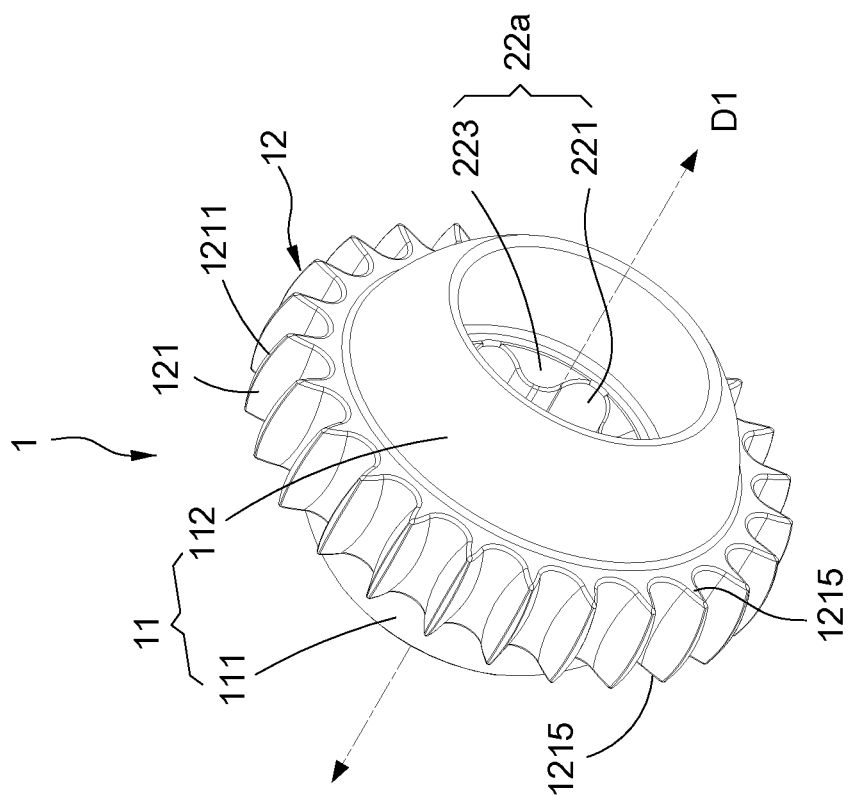

The clutch assembly 2a having function of connecting and releasing is arranged between the power transmission assembly 1 and the screw assembly 3 as shown in FIG. 4, so that the nut 31a can be operated by the clutch assembly 2a to connect to or release the power transmission assembly 1 along the radial direction D2. In other words, the clutch assembly 2a is defined with a connected status and a released status, the clutch assembly 2a is at the connected status when the nut 31a is connected to the power transmission assembly 1 so that the power transmission assembly 1 can transmit power through the nut 31a to move the screw rod 32 along the longitudinal direction D1; on the contrary, clutch assembly 2a is at the released status when the nut 31a releases the power transmission assembly 1 so that the power transmission assembly 1 cannot transmit power through the nut 31a.

Figure 5:
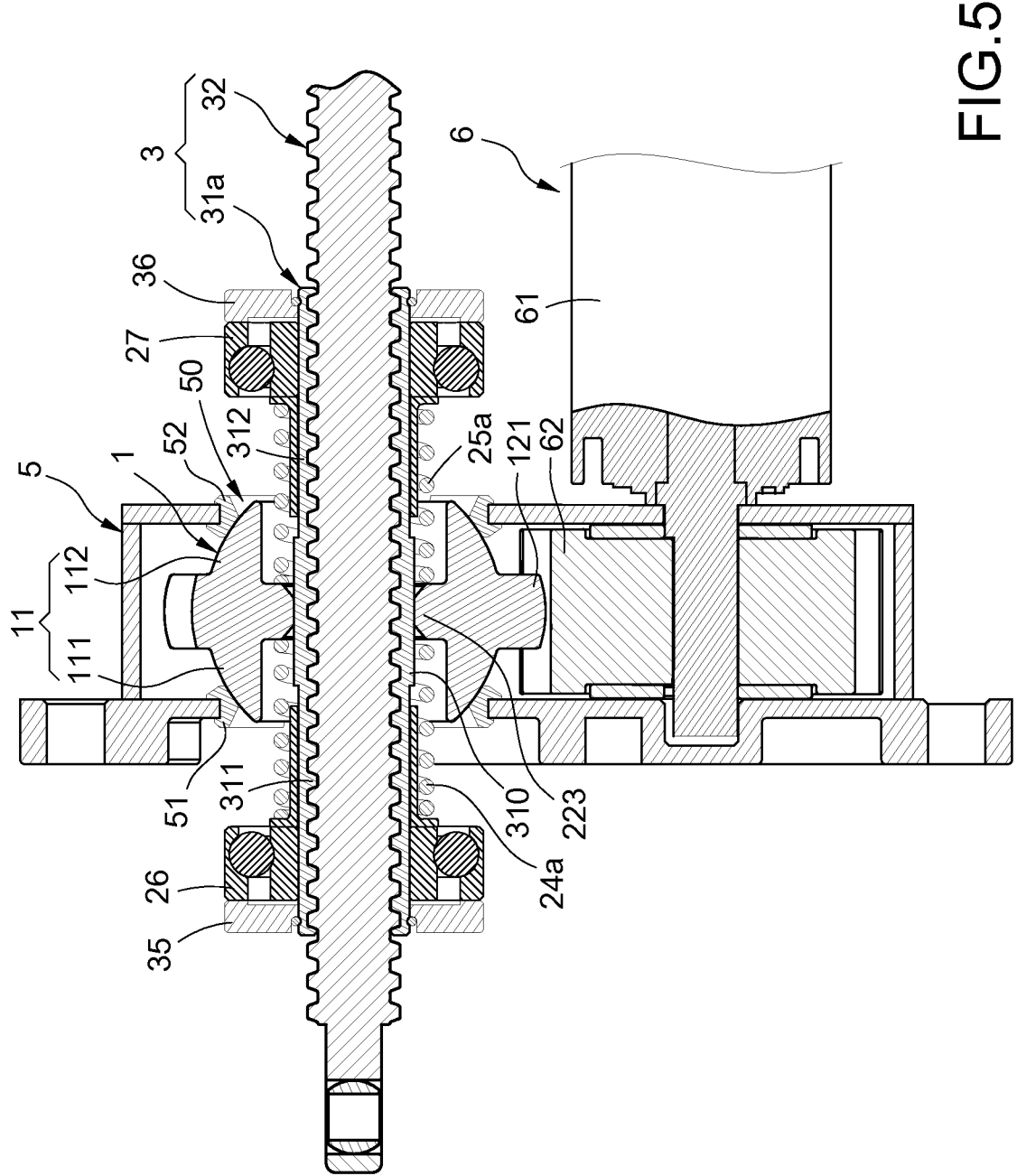
FIG. 5 is a cross-sectional view of the first embodiment of this disclosure in a connected status.

The clutch assembly 2a may be any component with engaging and disengaging functions and should not be limited in this disclosure, in this embodiment, an example is illustrated in this paragraph. The clutch assembly 2a has a first addendum and dedendum structure 21a and a second addendum and dedendum structure 22a capable of engaging with each other. The first addendum and dedendum structure 21a is annually disposed on an external periphery of the nut 31a, the second addendum and dedendum structure 22a are annually disposed on an internal edge in the power transmission assembly 1 of a hollow shape, the first addendum and dedendum structure 21a is engaged with the second addendum and dedendum structure 22a as shown in FIGS. 4 and 5. According to FIGS. 6 and 7, when an external force (a force from the driving power source 6 is excluded) is applied to the swing member O, the swing member O is meanwhile driven by the external force to move with the power transmission assembly 1 and the second addendum and dedendum structure 22a along the longitudinal direction D1 relative to the screw assembly 3; simultaneously, the second addendum and dedendum structure 22a is moved with the power transmission assembly 1 so that the second addendum and dedendum structure 22a will deviate from the first addendum and dedendum structure 21a along the longitudinal direction D1 to separate the power transmission assembly 1 from the nut 31a.

In other words, as shown in FIG. 4, the nut 31a is engaged with the power transmission assembly 1 when the first addendum and dedendum structure 21a and the second addendum and dedendum structure 22a are mutually interfered with each other in the radial direction D2 or overlap in the radial direction D2.

In detail as shown in FIGS. 3 and 4, the first addendum and dedendum structure 21a mentioned above has a plurality of first tooth dedendums 211 and a plurality of first tooth addendums 213, the first tooth addendums 213 are disposed at interval and protrudes from the outer periphery of the nut 31a along the radial direction D2, each of the first tooth dedendums 211 is disposed between two of the first tooth addendum 213 which are adjacent to each other; the second addendum and dedendum structure 22a has a plurality of second tooth dedendums 221 and a plurality of second tooth addendums 223 arranged on the internal edge of the power transmission assembly 1, the second tooth addendums 223 are extended into the first tooth dedendums 211 respectively along the radial direction D2, the first tooth addendums 213 are extended into the second tooth dedendums 221 respectively along the radial direction D2. In this embodiment, the tooth addendums are extended into the tooth dedendums respectively along the radial direction D2 so that the nut 31a can be operated by the clutch assembly 2a to engage or release the power transmission assembly 1 along the radial direction.

Figure 7:
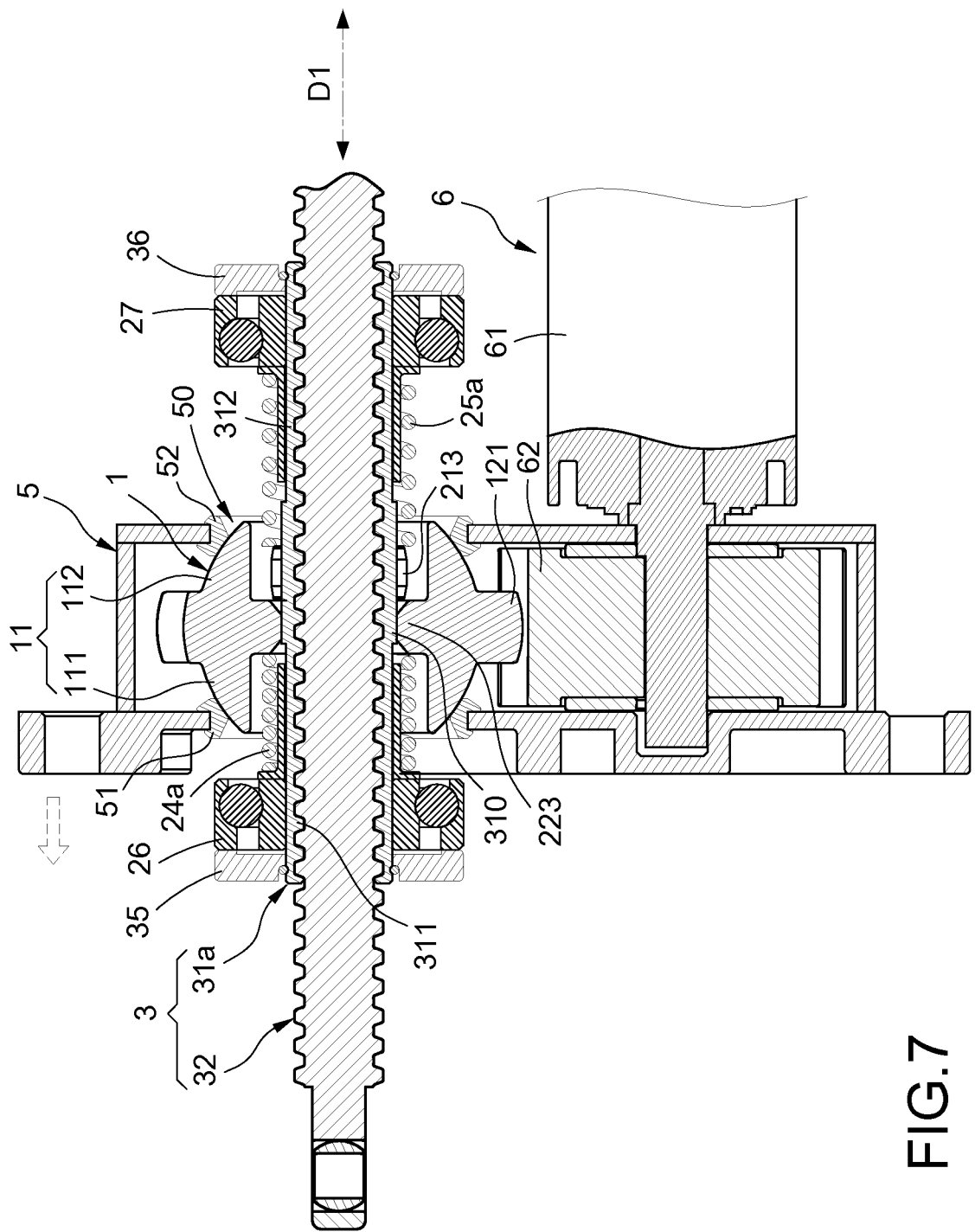
FIG. 7 is a cross-sectional view of the first embodiment of this disclosure in a released status when the swing member is applied an external force.

According to FIGS. 3, 5 and 7, the clutch assembly 2a has a first elastic member 24a and a second elastic member 25a used for returning the first addendum and dedendum structure 21a and the second addendum and dedendum structure 22a deviated from each other to the connected status. The first elastic member 24a and the second elastic member 25a are respectively disposed at two sides of the nut 31a, so that the nut 31a can be driven by elastic forces caused by the first elastic member 24a and the second elastic member 25a to move along the longitudinal direction D1 and engaged with the power transmission assembly 1 along the radial direction D2 through the clutch assembly 2a.

Specifically, according to FIGS. 3 and 5, the clutch assembly 2a further has a first bearing 26 and a second bearing 27, and the nut 31a has a nut body 310, a first extending segment 311 and a second extending segment 312. The nut body 310 can engage or release the power transmission assembly 1 along the radial direction, the first extending segment 311 and the second extending segment 312 are respectively extended from the nut body 310. Specifically, the first bearing 26 and the second bearing 27 are respectively arranged at the first extending segment 311 and the second extending segment 312. The first elastic member 24a sleeves the first extending segment 311, and the second elastic member 25a sleeves the second extending segment 312, so that one end of the first elastic member 24a abuts against one side of the first bearing 26, and one end of the second elastic member 25a abuts against one side of the second bearing 27. An other end of the first elastic member 24a and an other end of the second elastic member 25a respectively abut against positions which are not limited in this disclosure but illustrated as FIGS. 5 and 7 in this embodiment, for example. The other end of the first elastic member 24a and the other end of the second elastic member 25a abut against two sides of an addendum and dedendum combination (namely a combination of the first addendum and dedendum structure 21a and the second addendum and dedendum structure 22a). When the addendum and dedendum combination is deviated, the other of the first elastic member 24a abut against the first addendum and dedendum structure 21a, and the other end of the second elastic member 25a abut against the second addendum and dedendum structure 22a so that the first elastic member 24a and the second elastic member 25a are elastically compressed respectively to cause an elastic recovery force to returned the addendum and dedendum combination to the connected status.

Figure 10:
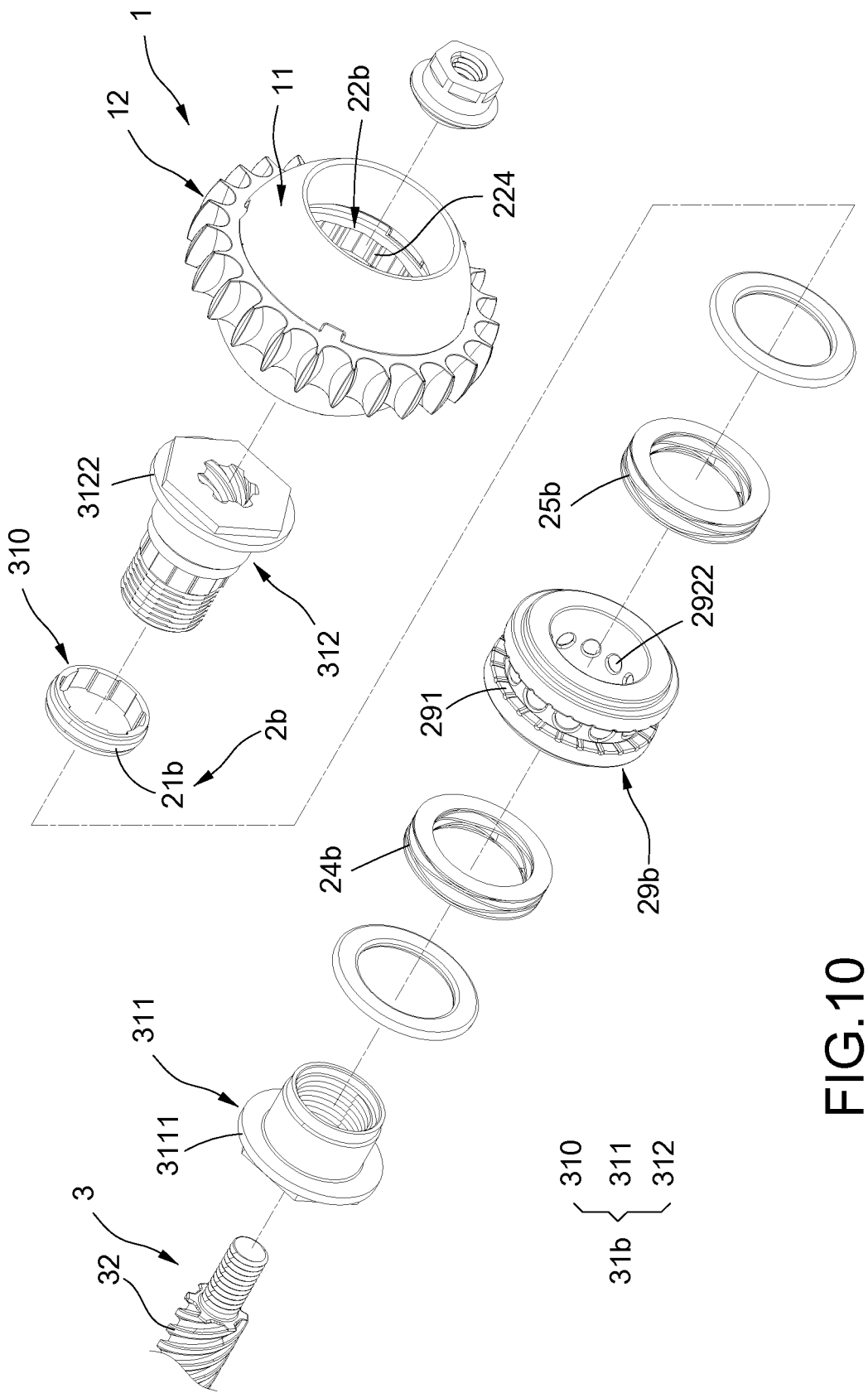
FIG. 10 is an exploded view of the second embodiment of this disclosure.
Figures 1, 10:
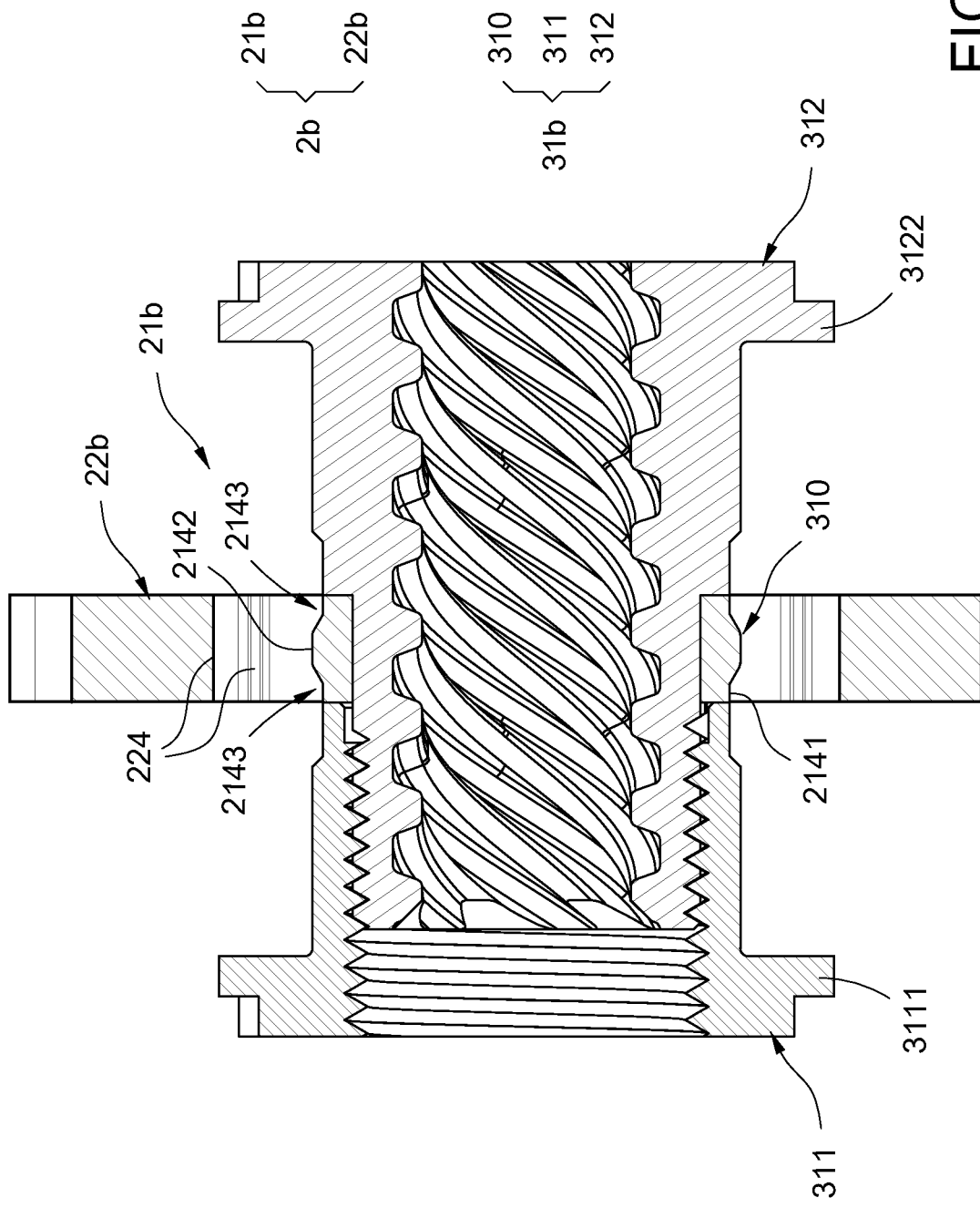

It should be noted that, in this disclosure, the first elastic member 24a and the second elastic member 25a, for example, may be long cylinder springs as shown in FIG. 3, short cylinder springs (a first elastic member 24b and a second member 25b belonging to the wave spring as shown in FIG. 10) or any other springs which are capable of recovery, but should not be limited to the embodiment.

As shown in FIGS. 5 and 7, the driving device 100 has a clutch assembly 2a, the swing member O can be driven to open or close by the power from the driving power source 6 when the clutch assembly 2a is at the connected status, and the nut 31a is disconnected from the power from the driving power source 6 when the clutch assembly 2a is at the released status (the power transmission assembly 1 is meanwhile driven by the driving power source 6 to idle, and the nut 31a cannot be driven by the power transmission assembly 1 and stops rotation). Accordingly, an external force (such as manual force) may be directly applied to the swing member O when the swing member O at any status (e.g. completely opened, completely closed, located at one location between the completely opened and completely closed positions or during a power-driven operation of opening of closing). For example, the swing member O can be stopped during a power-driven operation of opening of closing, but an operation the external force should not be limited to the embodiment in this disclosure. The power transmission assembly 1 or other mechanical parts in the driving power source 6 cannot be reversed by the external force because the power from the driving power source 6 is disconnected from the nut 31a, so as to avoid from mechanical damage. The clutch assembly 2a at the released status can be returned to the connected status by the elastic forces caused by the first elastic member 24a and the second elastic member 25a when the external force is not present. Accordingly, the nut 31a can engage to or release the power transmission assembly 1 when the screw assembly 3 is moved along the longitudinal direction D1 relative to the power transmission assembly 1 (to extend or retract).

In detail, during a transfer operation to the swing member O driven by the driving device 100 from a closed status as shown in FIG. 1 to an opened status as shown in FIG. 6, the swing member O will be moved with the power transmission assembly 1 relative to the screw assembly 3 to switch the clutch assembly 2a to the released status when an user touch the swing member O, so as to disconnect the nut 31a from the power from the driving power source 6, thereby preventing the driving device 100 from damage and allowing an manual operation to interrupt a power-driven operation.

It should be noted that, according to this embodiment, in order to prevent the swing member O at the opened position from being forced to close by gravity when the transportation carrier mentioned above is located on a slope, the first elastic member 24a and the second elastic member 25a provide elastic forces sufficient for resist the gravity applied on the swing member O, so as to maintain the clutch assembly 2a at the connected status.

According to FIGS. 2 to 3-1, 5 and 8, in order to allow the screw assembly 3 to swing, the driving device 100 according to this disclosure further has a housing 5, the housing 5 is arranged on the swing member O and the housing 5 has a limiting portion 50, the power transmission assembly 1 is arranged on the limiting portion 50 and configured to be rotatable. Specifically, the power transmission assembly 1 may be a sphere 11, the power transmission assembly 1 is correspondingly arranged in the limiting portion 50, the driving power source 6 is also arranged in the housing 5.

In detail, the housing 5 further has a first bushing 51 and a second bushing 52 which are both arranged on the limiting portion 50, the power transmission assembly 1 is arranged between the first bushing 51 and the second bushing 52 to allow the power transmission assembly 1 to be rotated relative to the housing 5.

Accordingly, when an angular variation of the screw rod 32 relative to the longitudinal direction D1 in the initial status is generated about the power transmission assembly 1 as a center, the power transmission assembly 1 is rotated with the angular variation of the screw rod 32 mentioned above. In other words, the screw assembly 3 is allowed to swing, so as to avoid an angular variation between the screw rod 32 and the first axis H1 mentioned above and occurring in an opening operation or a closing operation of the swing member O, and also prevent the swing member O from sagging relative to the main body mentioned above.

According to FIGS. 2 to 4 and 8, a portion driven by the driving power source 6 corresponding to the swing of the power transmission assembly 1 should be correspondingly rearranged: the power transmission assembly 1 has a ring gear 12 and the sphere 11 mentioned above, the ring gear 12 is configured to surround an external periphery of the sphere 11, the power transmission assembly 1 is meshed with the driving power source 6 via the ring gear 12, so that the power transmission assembly 1 can be driven by the driving power source 6. The ring gear 12 is a ring disposed with a plurality of driven teeth 121 of oval shapes, so that the driven teeth 121 is meshed with a driving gear 62 of the driving power source 6 and allowed to swing when the power transmission assembly 1 is rotated. The sphere 11 and the ring gear 12 may be configured as one piece or assembled to each other, but it should not be limited in this disclosure.

In detail the driven teeth 121 are disposed on the external periphery of the sphere 11 along the longitudinal direction D1, and each of the driven teeth 121 has an outer edge 1211 away from the external periphery of the sphere 11, the outer edge 1211 is of an arc shape; each of the driven teeth 121 has two end portion 1215 disposed on the longitudinal direction D1, each of the end portion 1215 is of a shape converged from the external periphery of the sphere 11 along a direction away from the external periphery of the sphere 11.

Figure 8:
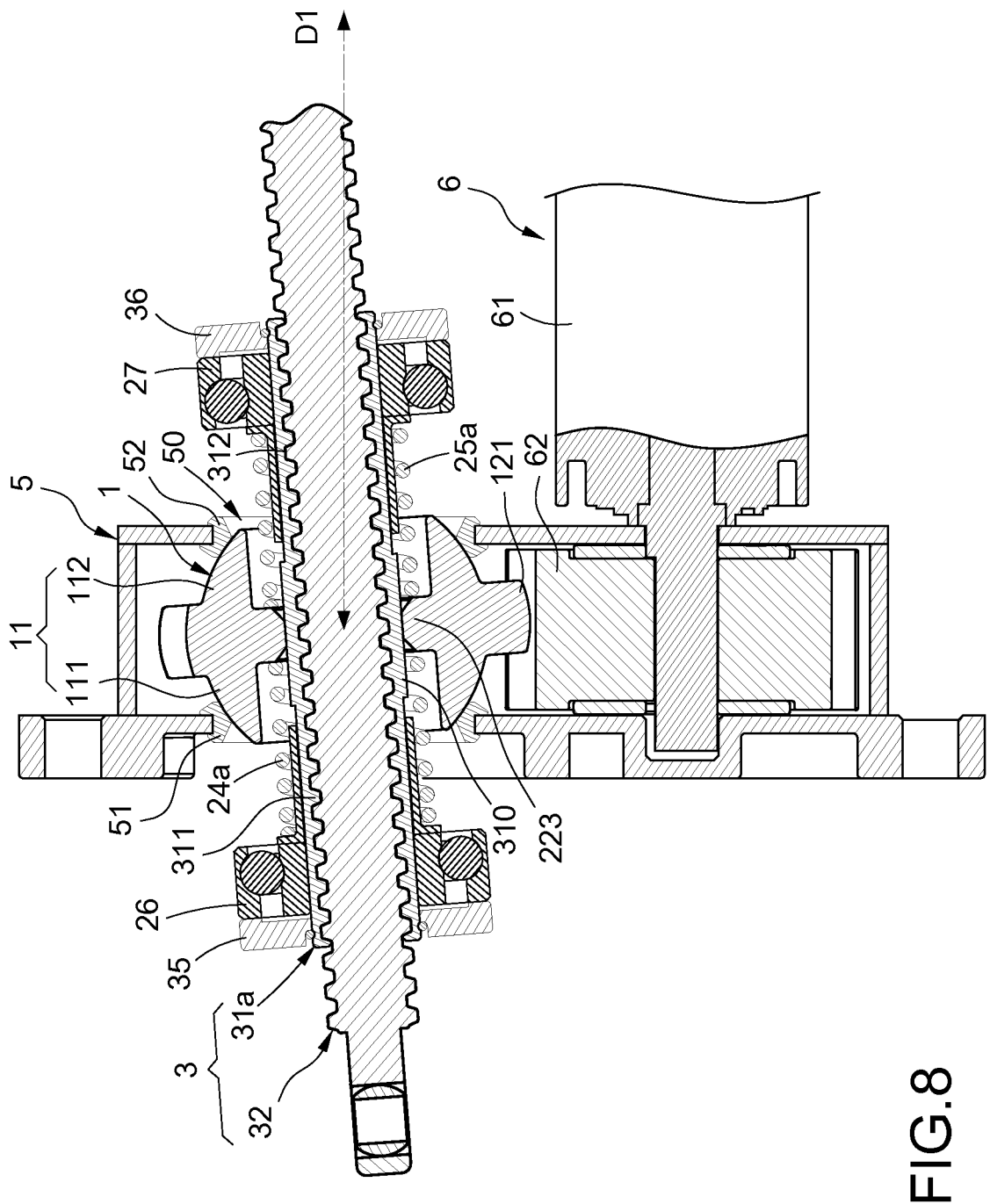
FIG. 8 is a cross-sectional view of the first embodiment of this disclosure when the screw rod and the power transmission assembly simultaneously perform an angular variation.
Figure 9:
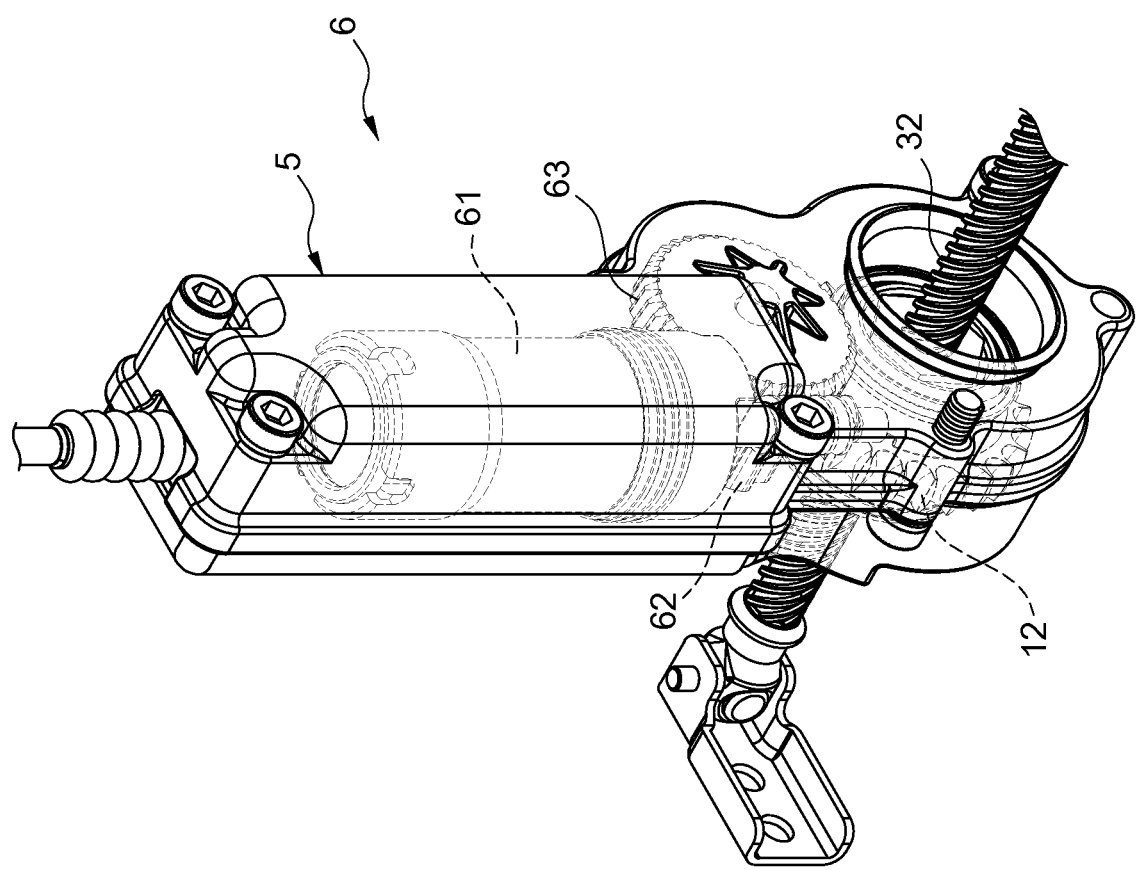
FIG. 9 is a perspective view showing the second embodiment of this disclosure.

According to FIG. 8, when the screw rod 32 swings, a meshing angular variation between the driven teeth 121 and the driving gear 62 is caused by the swinging, because the driven teeth 121 is of an oval shape so as to ensure the power transmission. In other words, the power transmission assembly 1 is allowed to rotate relative to the housing 5 with the swinging of the screw rod 32.

It should be additionally noted that, the sphere 11 as shown in FIG. 3-1 has a first hemispherical structure 111 and a second hemispherical structure 112, the first hemispherical structure 111 and the second hemispherical structure 112 are respectively arranged at two sides of the ring gear 12, and the first hemispherical structure 111 and the second hemispherical structure 112 are respectively contacted with the first bushing 51 and the second bushing 52 as shown in FIG. 5, so that the power transmission assembly 1 can be held at a position in the housing 5 and configured to be rotatable.

In addition, as shown in FIGS. 3 and 5, the first extending segment 311 and the second extending segment 312 of the nut 31a are respectively inserted in a first stopping ring 35 and a second stopping ring 36. The first stopping ring 35 is contacted with only an outer ring of the first bearing 26 and the second stopping ring 36 is contacted with only an outer ring of the second bearing 27 respectively. An inner ring of the first bearing 26 is contacted with one end of the first elastic member 24a and an inner ring of the second bearing 27 is contacted with one end of the second elastic member 25a, so that one of the inner ring and the outer ring of the first bearing 26 is rotatable relative to another, and one of the inner ring and outer ring of the second bearing 27 is rotatable relative to another.

The driving power source 6 may be any component capable of power driving and should not be limited to the embodiment in this application. According to an example illustrated in this embodiment, the driving power source 6 has a driving body 61 and a driving gear 62 as shown in FIG. 2. The driving gear 62 is driven to rotate by the driving body 61. The driving gear 62 is meshed with the ring gear 12. The power transmission assembly 1 is driven to rotate by the driving body 61 through the driving gear 62. In this embodiment, the driving body 61 may be a motor.

Second Embodiment

According to the second embodiment of the driving device 100 of this disclosure as shown in FIGS. 9 to 17, the second embodiment is substantially the same as the first embodiment, and only different at the clutch assembly 2b and the nut 31b.

The clutch assembly 2b has an interactive structure 21b, an engaging structure 224 and a plurality of rollers 28, and the clutch assembly 2b further has a cage 29b in this embodiment. Specifically, the engaging structure 224 is annually disposed on the internal edge of the power transmission assembly 1 of a hollow shape; the interactive structure 21b is annually disposed on the external periphery of the nut 31b and fixed with the nut 31b, the interactive structure 21b has a convex portion 2142 and two concave portions 2143 dent relative to the convex portion 2142, the convex portion 2142 and the two concave portions 2143 are disposed side by side along the longitudinal direction D1; the plurality of rollers 28 are arranged between the engaging structure 224 and the interactive structure 21b. According to this embodiment, the nut 31b has an outer peripheral surface 2141 on the external periphery, the interactive structure 21b is configured to surround the outer peripheral surface 2141 of the nut 31b, and the convex portion 2142 protrudes from one portion of the outer peripheral surface 2141 along the radial direction D2 as shown in FIG. 10-1, and the concave portion 2143 is correspondingly disposed between the convex portion 2142 and remained portions of the outer peripheral surface 2141. In addition, the interactive structure 21b may be formed with the nut body 310 as one piece or assembled with the nut body 310.

Figure 11:
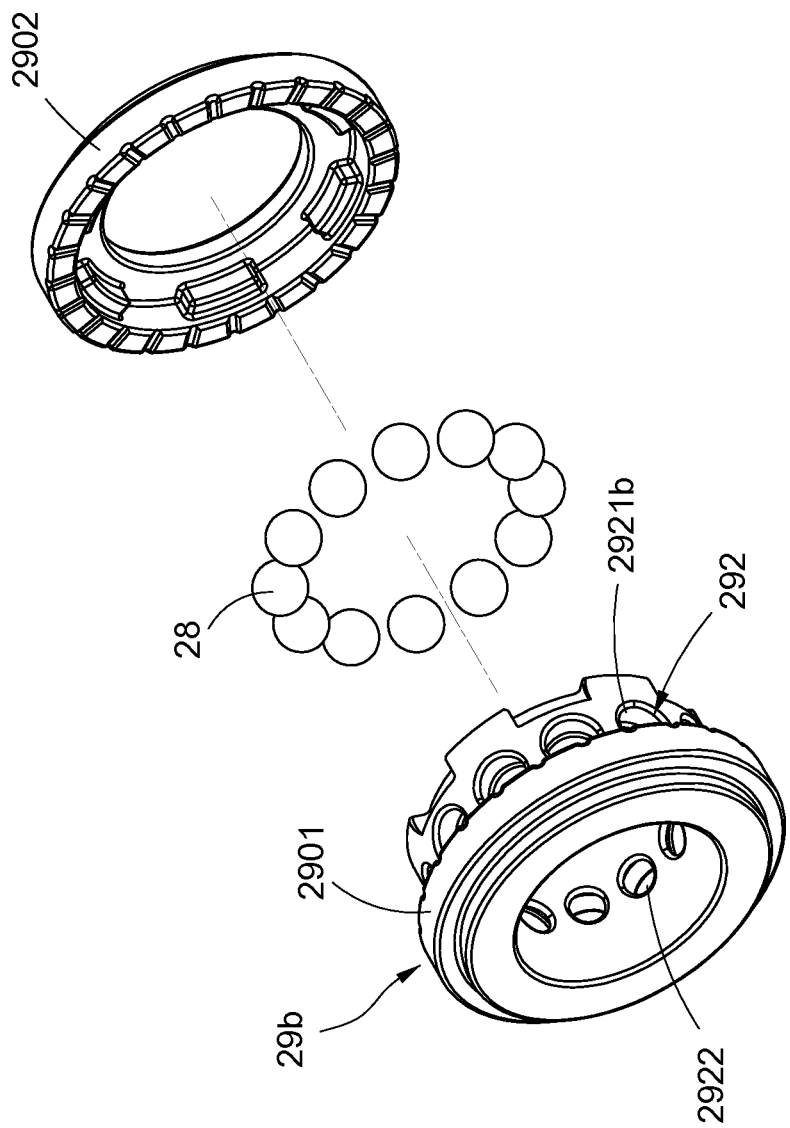
FIG. 11 is an exploded view showing a cage and rollers of the second embodiment of this disclosure.
Figure 12:
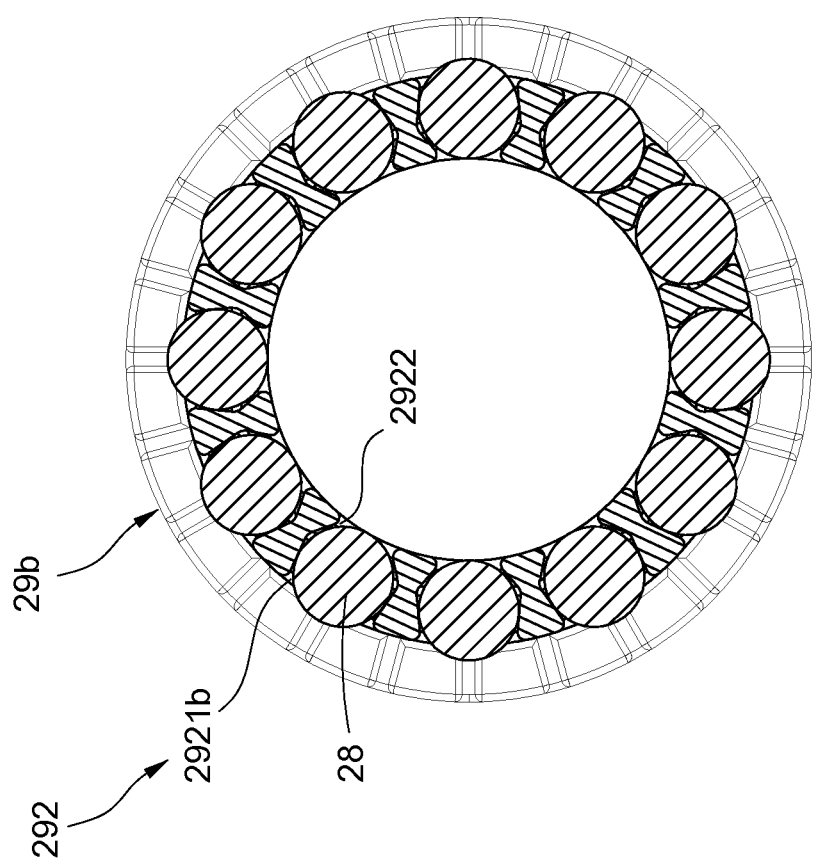
FIG. 12 is a cross-sectional view of the second embodiment as shown in FIG. 11.

According to FIGS. 10 to 12, the cage 29b has a plurality of accommodating holes 292 disposed along the radial direction D2, the rollers 28 are accommodated in the accommodating holes 292 respectively and configured to be movable. The cage 29b is arranged in the sphere 11 of the power transmission assembly 1, and the engaging structure 224 is configured to surround the rollers 28 along the radial direction D2. Each of the accommodating holes 292 has an opening 2921b and a convergent opening 2922 disposed on the radial direction D2, each of the rollers 28 has one portion exposed toward the engaging structure 224 through the opening 2921b and an other portion exposed toward the interactive structure 21b through the convergent opening 2922, so that the portion and the other portion in each of the rollers 28 are applied to the engaging structure 224 and the interactive structure 21b respectively.

Figure 15:
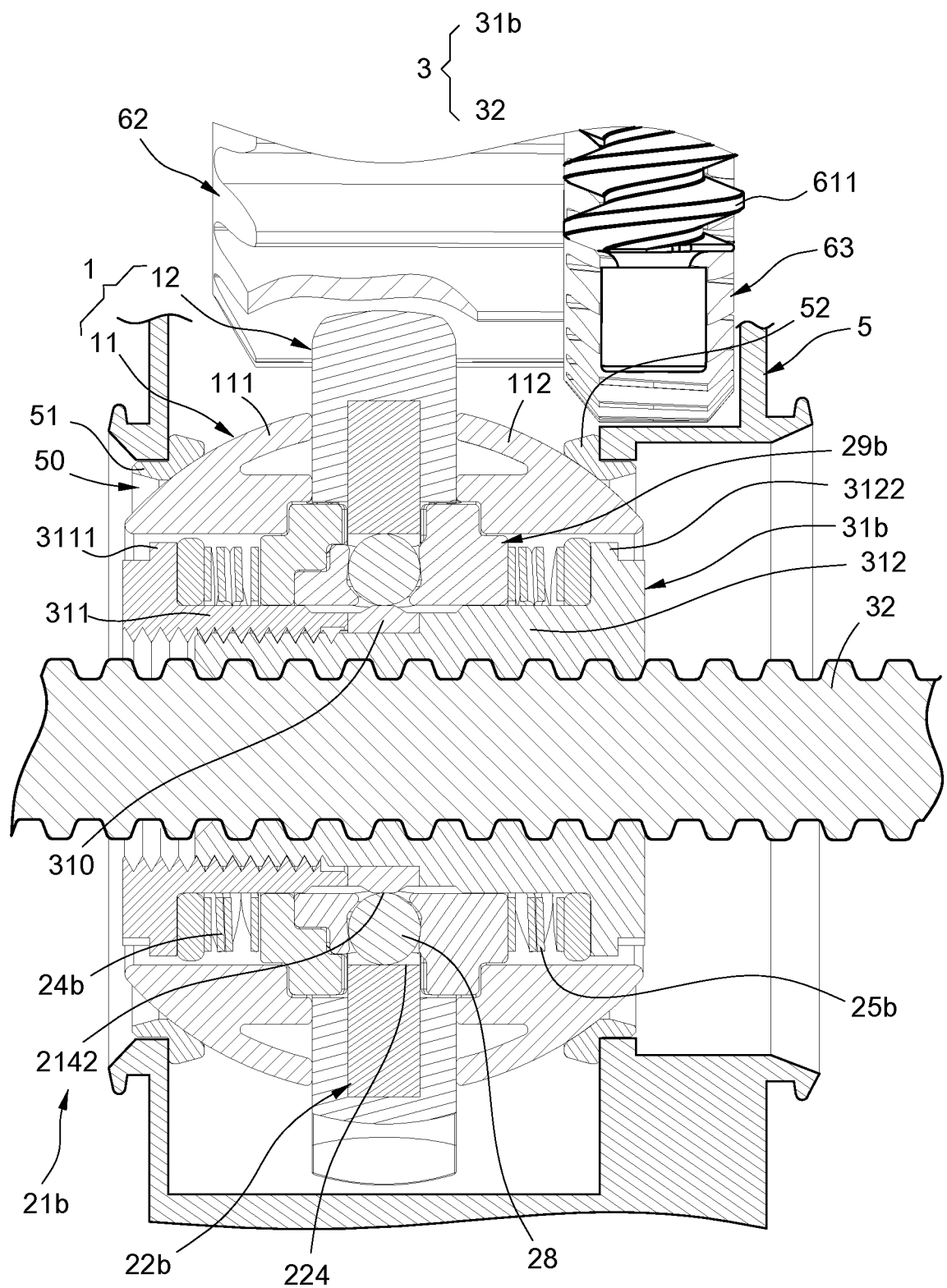
FIG. 15 is a cross-sectional view of the second embodiment of this disclosure in a connected status.

According to FIGS. 10 to 10-1 and 15, the first extending segment 311 of the nut 31b has a first stopping portion 3111, and the second extending segment 312 of the nut 31b has a second stopping portion 3122, the first elastic member 24b sleeves the first extending segment 311, and the second elastic member 25b sleeves the second extending segment 312, so that the first elastic member 24b is disposed between the first stopping portion 3111 and one side of the cage 29b for elastically supporting, and the second elastic member 25b is disposed between the second stopping portion 3122 and another side of the cage 29b for elastically supporting.

The cage 29b may be a single-piece structure (not shown in the figures) or a combination structure as shown in FIG. 11 which has a first cage member 2901 and a second cage member 2902 which can be combined with each other. A surrounding groove 291 is defined on a combination of the first cage member 2901 and the second cage member 2902.

Figure 13:
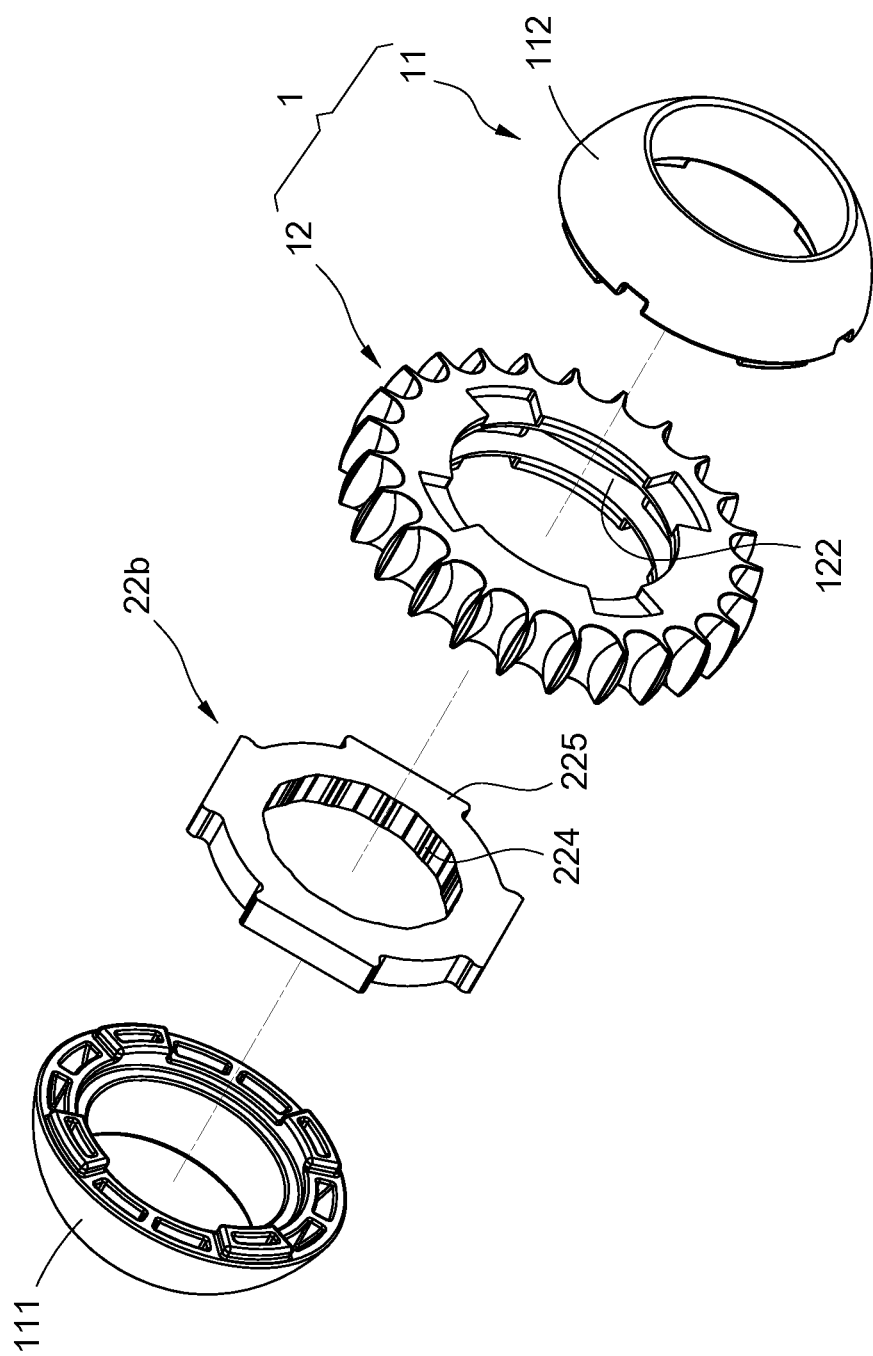
FIG. 13 is an exploded view showing a power transmission assembly and an engaging ring of the second embodiment of this disclosure.

According to FIGS. 10, 13 and 15, the clutch assembly 2b further has an engaging ring 22b, the engaging ring 22b is arranged on the sphere 11 and provided with an engaging structure 224, the cage 29b is arranged between the power transmission assembly 1 and the nut 31b and defined with a surrounding groove 291 as shown in FIG. 10, the surrounding groove 291 is communicated with the openings 2921b respectively, the engaging ring 22b has one portion extended into the surrounding groove 291, and the engaging structure 224 is disposed to face the openings 2921b respectively. It should be noted that, the engaging structure 224 may be any component capable of engaging and should not be limited to the embodiment in this disclosure. Furthermore, the engaging structure 224 has a shape which allows the rollers 28 to engage the engaging structure 224 and the interactive structure 21b; the engaging ring 22b may be fixed with the power transmission assembly 1 by any approach capable of fixing and should not be limited to the embodiment in this disclosure. An example as shown in FIGS. 13 and 15 is illustrated in following paragraph: the engaging ring 22b has at least a latching structure 225 protruding along the radial direction D2. The ring gear 12 has at least a counterpart latching structure 122, the counterpart latching structure 122 is latched by the latching structure 225 so as to fix the engaging ring 22b with the ring gear 12.

Figure 14:
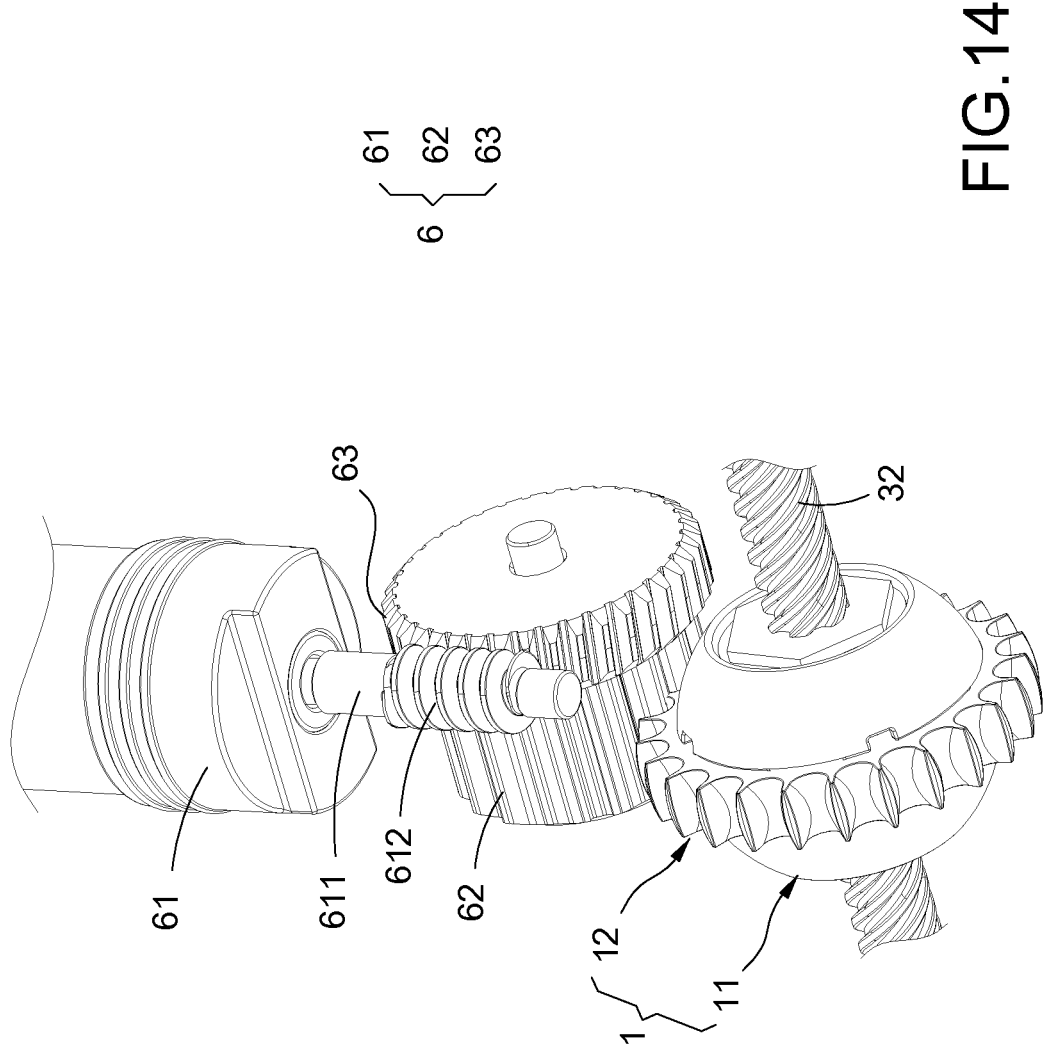
FIG. 14 is a perspective view showing a driving power source of the first embodiment of this disclosure.

In addition, in this embodiment, in order to prevent the driving power source 6 from reverse driving, the driving power source 6 as shown in FIG. 14 further has a worm gear 63. The worm gear 63 and the driving gear 62 are fixed with each other and configured to be coaxial. The driving body 61 has a driving shaft 611. A spiral thread 612 protrudes from the outer periphery of the driving shaft 611, and the spiral thread 612 meshes with the worm gear 63. In this way, the tooth profile design of the spiral thread 612 and the worm gear 63 can prevented the spiral thread 612 from reverse driving.

Figure 16:
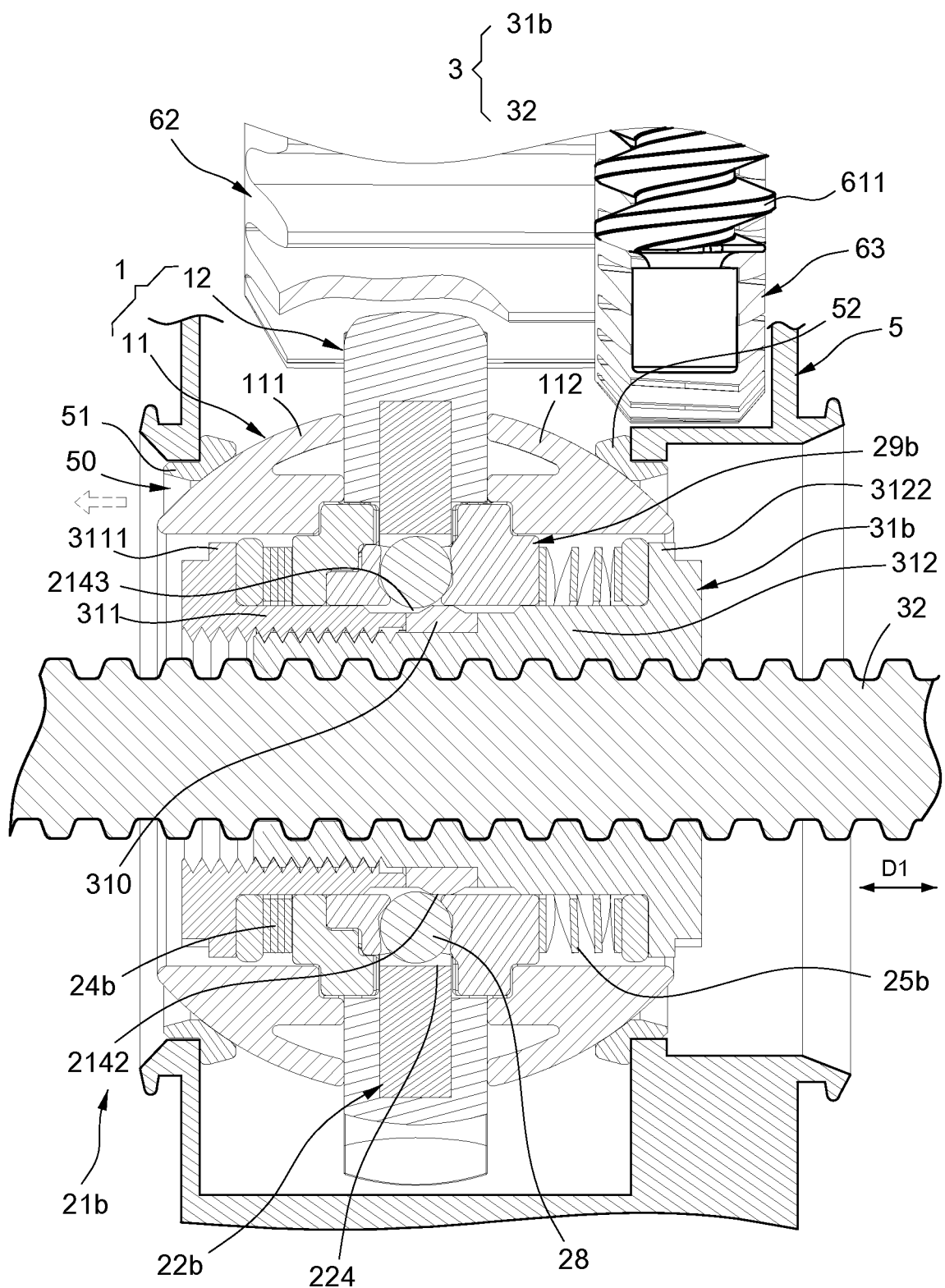
FIG. 16 is a cross-sectional view of the second embodiment of this disclosure in a released status when the swing member is applied an external force.
Figure 17:
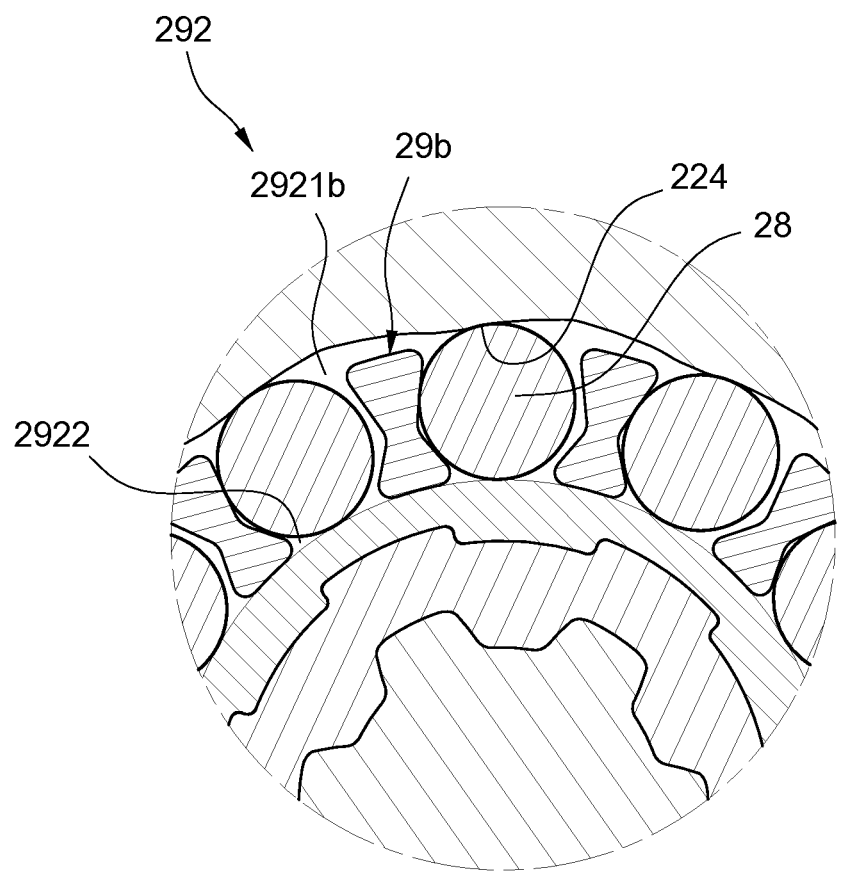
FIG. 17 is a cross-sectional view showing a part of elements of the second embodiment of this disclosure in a connected status.
Figure 18:
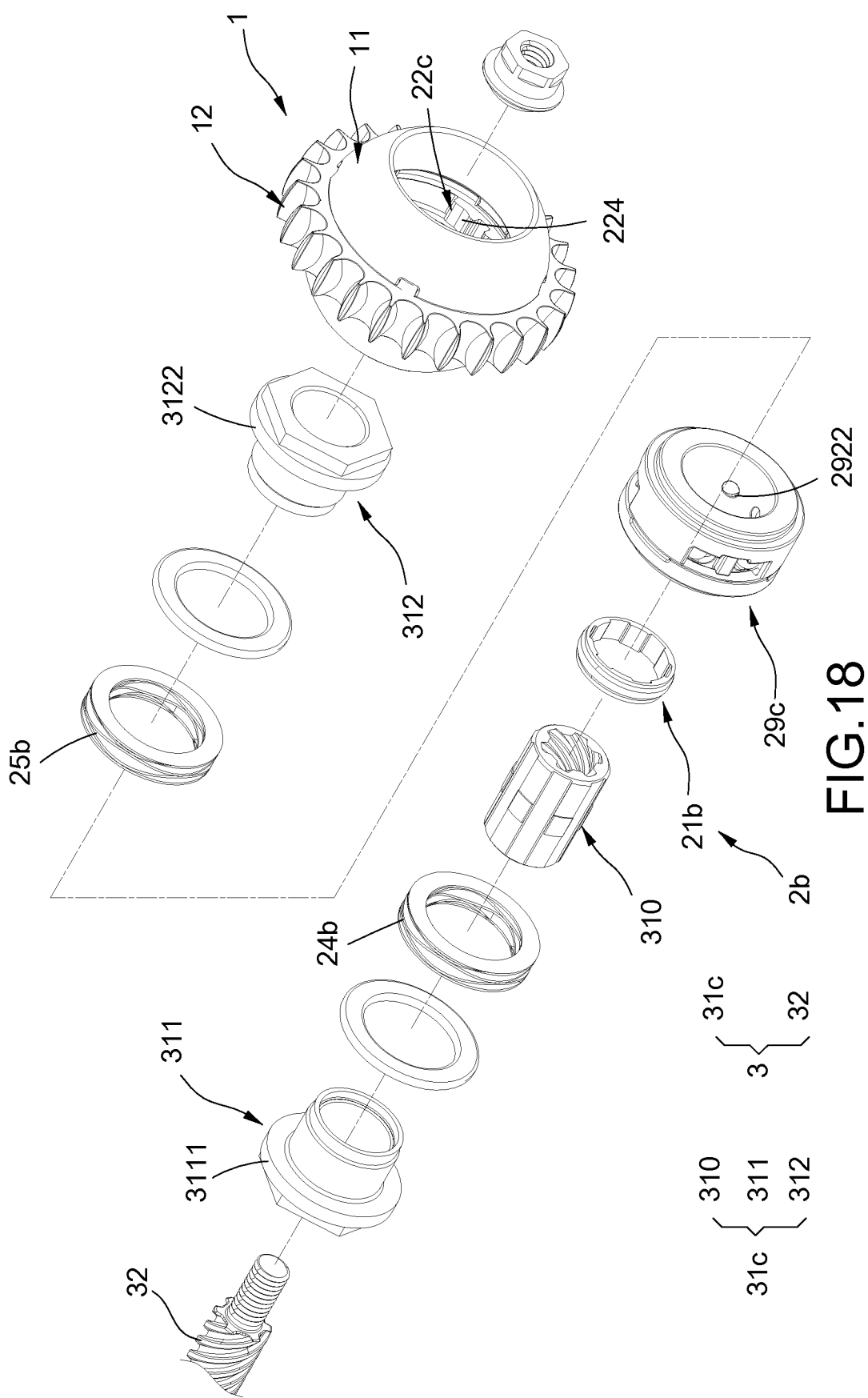
FIG. 18 is an exploded view of the third embodiment of this disclosure.

Accordingly, as shown in FIGS. 9, 13, 15 and 17, when the power transmission assembly 1 is driven to start rotating by the driving power source 6, the engaging ring 22b will follow the power transmission assembly 1 to rotate with the engaging structure 224 thereof. In this status, the rollers 28 mutually interfered with or overlap the engaging structure 224 and the interactive structure 21b in the radial direction D2, so that a part of the rollers 28 in the cage 29b will be pushed and pressed by the engaging structure 224, and the rollers 28 are engaged between the engaging structure 224 and the convex portion 2142 so as to engage the nut 31b with the power transmission assembly 1, so that each ball roller 28 is locked between the engaging structure 224 and the convex portion convex portion 2142, and then the nut 31b engages the transmission assembly power transmission assembly 1. Accordingly, the nut 31a can be driven to rotate by the transmission assembly power transmission assembly 1 when the transmission assembly power transmission assembly 1 is driven to rotate by the driving power source 6 so as to move the screw rod 32 along the longitudinal direction D1 and further drive the swing member O to open or close. On the contrary, as shown in FIG. 16, when the swing member O is moved along the length direction D1 with the cage 29b and the engaging structure 224 by an external force applied by the user, the rollers 28 follows the cage 29b to move along the longitudinal direction D1. In this status, another part the ball rollers 28 is moved from the convex portions 2142 to the concave portions 2143 respectively, and then the rollers 28 drops into the concave portions 2143 respectively, so that the engaging structure 224 will not clamp the rollers 28, and then the power transmission assembly 1 is separated from the nut 31b. In this circumstance, the power transmission assembly 1 is suddenly separated from the nut 31b so that the power transmission assembly 1 cannot drive the nut 31b to rotate even if the screw rod 32 is driven, and the swing member O is operated by the external force of the user. It should be noted that, in this circumstance, the nut 31b is driven by the external force to rotate relative to the screw rod 32.

As shown in FIGS. 15 and 16, the driving device 100 of this disclosure has a clutch assembly 2b. The clutch assembly 2b allows the swing member O to be driven to open or close by a driving power from the driving source 6 when the clutch assembly 2b is in the connected status; the driving power from the driving power source 6 is disconnected from the nut 31b when the clutch assembly 2b is in the released status. Accordingly, an external force (such as manual force) may be directly applied to the swing member O when the swing member O is at any status (e.g. completely opened, completely closed, located at one location between the completely opened and completely closed positions or during a power-driven operation of opening of closing). For example, the swing member O can be stopped during a power-driven operation of opening of closing, but an operation of the external force should not be limited to the embodiment in this disclosure. Moreover, the external force the power transmission assembly 1 or other mechanism components in the driving power source 6 cannot be reversely driven, because the driving power from the driving power source 6 is disconnected from the nut 31b so as to prevent the driving device 100 from damage caused by this, and a power-driven operation is allowed to be interrupted by a manual operation in any status. The clutch assembly 2b can be returned to the connected status from the released status by elastic recovery forces caused by the first elastic member 24b and the second elastic member 25b when the external force applied thereon is canceled. Accordingly, the nut 31a can engage to or release the power transmission assembly 1 when the screw assembly 3 is moved along the longitudinal direction D1 relative to the power transmission assembly 1 (to extend or retract). In other words, the second embodiment of the driving device 100 of this disclosure performs all the effects the same as the first embodiment.

In addition, the housing 5 and the power transmission assembly 1 may be driven by gravity to move with the cage 29b and the engaging structure 224 along the longitudinal direction D1 if the swing member O is in the opened position when the transportation carrier is parked on a slope as mentioned above, because the swing member O is affected by gravity (a type of external force). As shown in FIG. 16, for example, the convex portion 2142 of the interactive structure 21b has a specific width cooperated with strokes of the first elastic member 24b and the second elastic member 25b, so that the rollers 28 can be held to engage between the engaging structure 224 and the convex portion 2142 when the roller 28 are not completely separated from the convex portion 2142. In detail, when the retainer cage 29b and the engaging structure 224 are moved together along the longitudinal direction D1, the first elastic member 24b is pressed by the cage 29b pushes, and the first elastic member 24b will be driven to press the first stopping portion 3111 of the nut 31b, so that the nut 31b is driven to further rotate relative to the screw rod 32. This rotation of the cage 29b mentioned above is driven through two ends of the first elastic member 24b. The rollers 28 are held by the cage 29b to engage between the engaging structure 224 and the convex portion 2142. In this circumstance, the gravity applied on the swing member O is not enough to drive the nut 31b to rotate the power transmission assembly 1 and the driving power source 6, so that the swing member O can be held at an opened position. Specifically, the driving power source 6 mentioned above further has a worm gear 63 so that the tooth profile mentioned above prevents the nut 31b from driving the power transmission assembly 1 and the driving power source 6 to rotate.

Third Embodiment

As shown in, it is the driving device 100 according to the third embodiment of the present application is shown in FIGS. 18 to 26. The third embodiment is substantially the same as the second embodiment and different at that the engaging ring 22c and the cage 29c are, and the clutch assembly 2b further has a plurality of auxiliary elastic members S.

Figure 19:
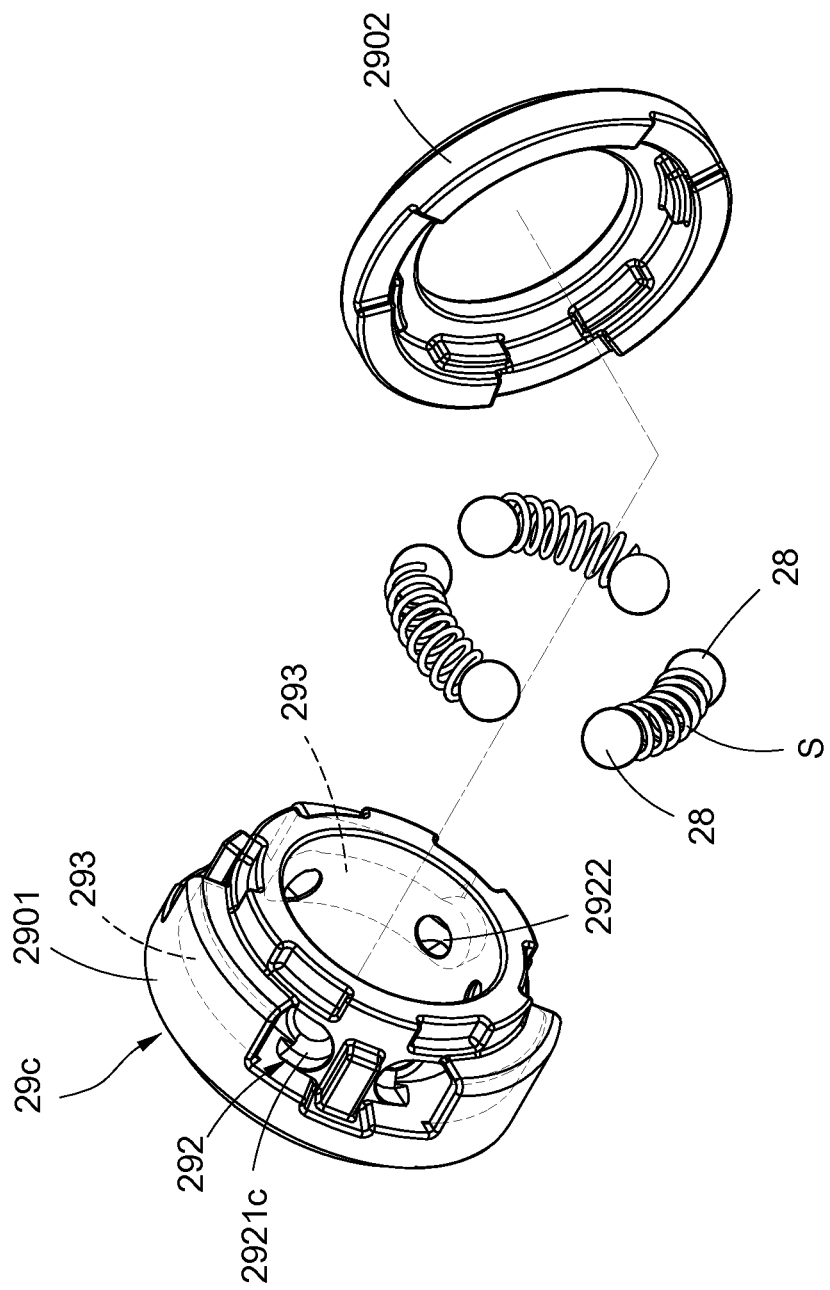
FIG. 19 is an exploded view showing a cage, rollers and auxiliary elastic members of the third embodiment of this disclosure.
Figure 20:
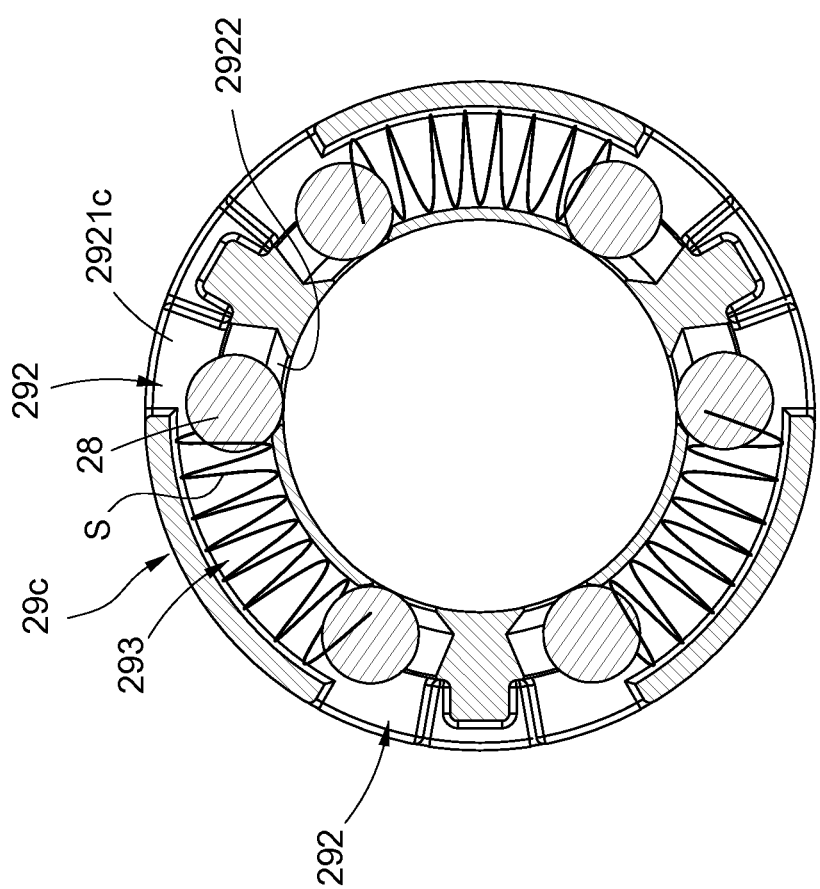
FIG. 20 is a cross-sectional view of the third embodiment as shown in FIG. 19.

As shown in FIGS. 19 and 20, the auxiliary elastic member S are arranged in the cage 29c respectively, and each of auxiliary elastic member S is disposed between two of the rollers 28 adjacent to each other for elastically supporting, namely that the rolls 28 may be limited by the auxiliary elastic members S.

Figure 21:
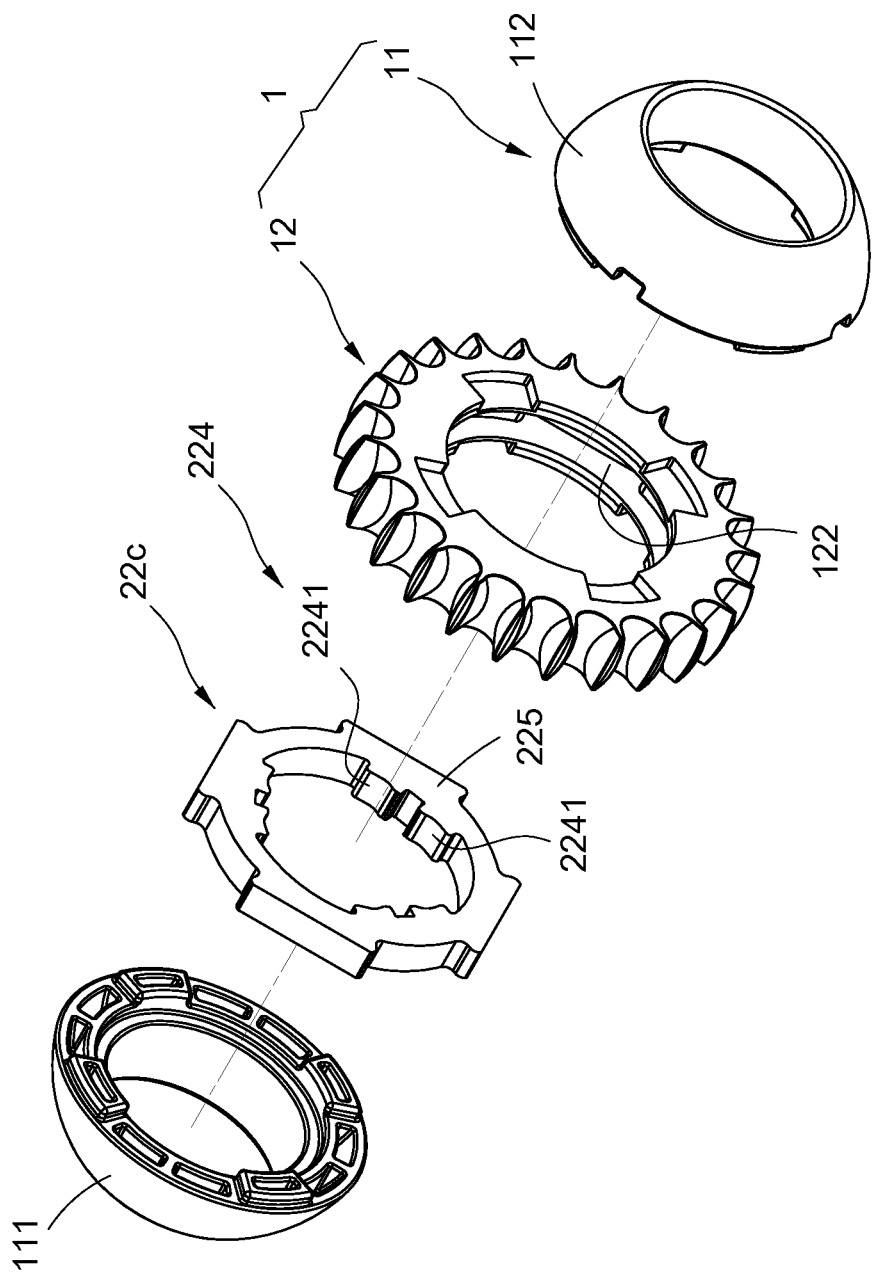
FIG. 21 is an exploded view showing a power transmission assembly and an engaging ring of the third embodiment of this disclosure.
Figure 22:
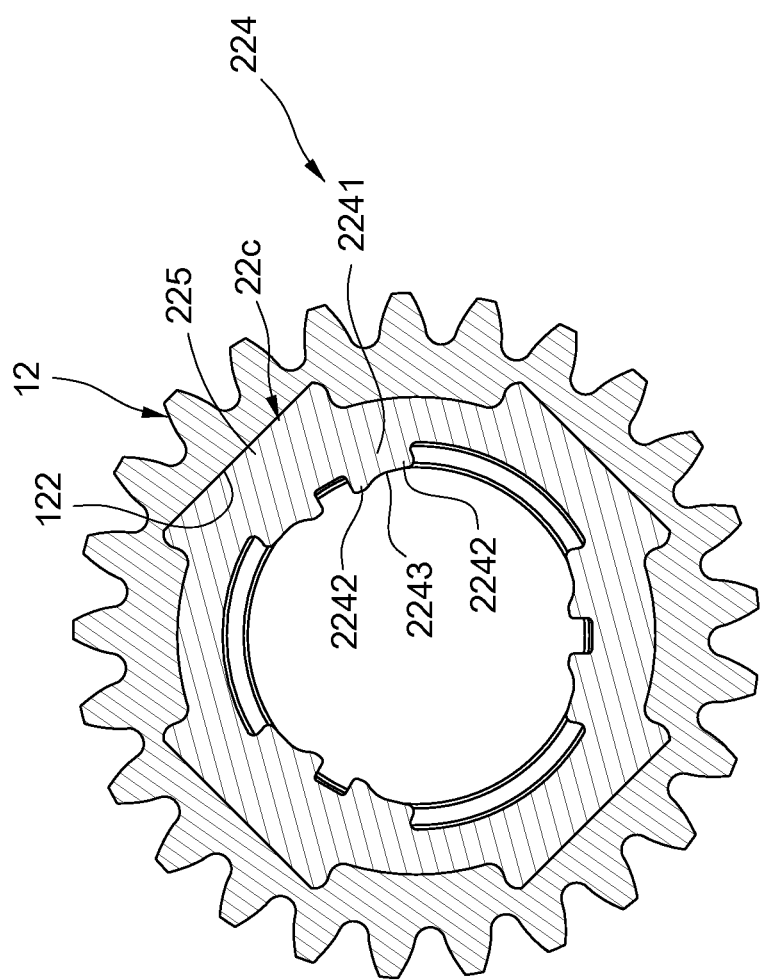
FIG. 22 is a cross-sectional view of the third embodiment assembled as shown in FIG. 21.

According to FIGS. 21 and 22, the engaging structure 224 has a plurality of engaging blocks 2241 correspondingly configured to surround the internal edge of the power transmission assembly 1, each of the engaging blocks 2241 has two engaging protrusions 2242 and a releasing recess 2243 dent relative to the engaging protrusions 2242, and the releasing recess 2243 is disposed between the two engaging protrusions 2242. Each of the roller 28 is engaged between the convex portion 2142 and the engaging protrusions 2242 of one of the engaging blocks 2241.

According to FIGS. 19 and 20, the cage 29c has a plurality of accommodating holes 292 and a plurality of through ways 293, each of the through ways 293 is communicated between two of the accommodating holes 292 adjacent to each other, and the auxiliary elastic members S are respectively accommodated in the through ways 293 between two of the rollers 28 adjacent to each other for elastically supporting. Each of the accommodating hole 292 has a notch 2921c and a convergent opening 2922, each of the accommodating hole 292 is communicated to the through way 293 through the notch 2921c thereof. According to FIG. 25, the engaging blocks 2241 are extended into the cage 29c through the notch 2921c respectively, each of the rollers 28 has one portion which may contact the engaging structure 224 through the notch 2921c and another portion exposed toward the interactive structure 21b through the convergent opening 2922 respectively. In addition, in this embodiment, the engaging ring 22c and the cage 29c are fixed with each other.

Figure 23:
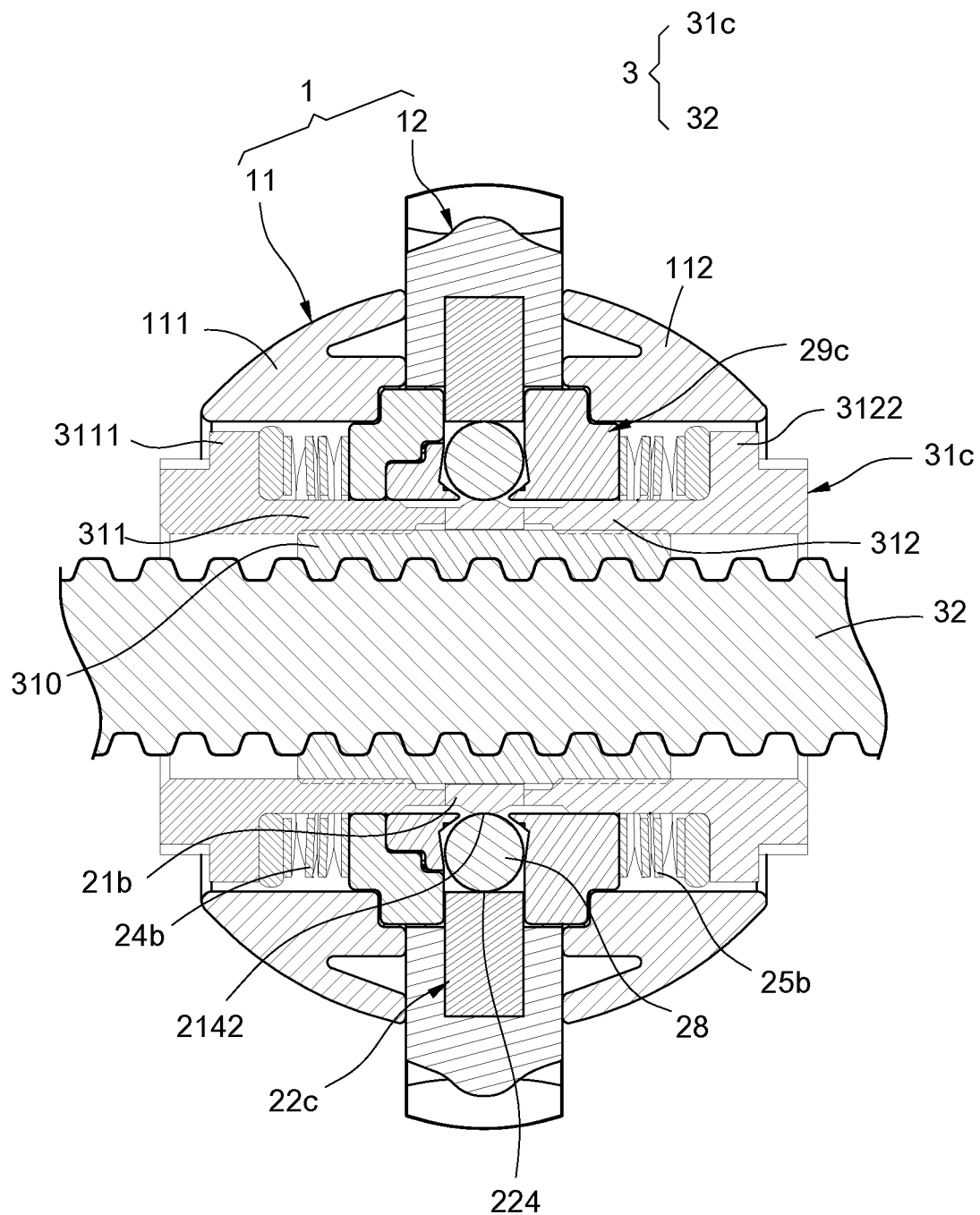
FIG. 23 is a cross-sectional view of the third embodiment of this disclosure in a connected status.
Figure 24:
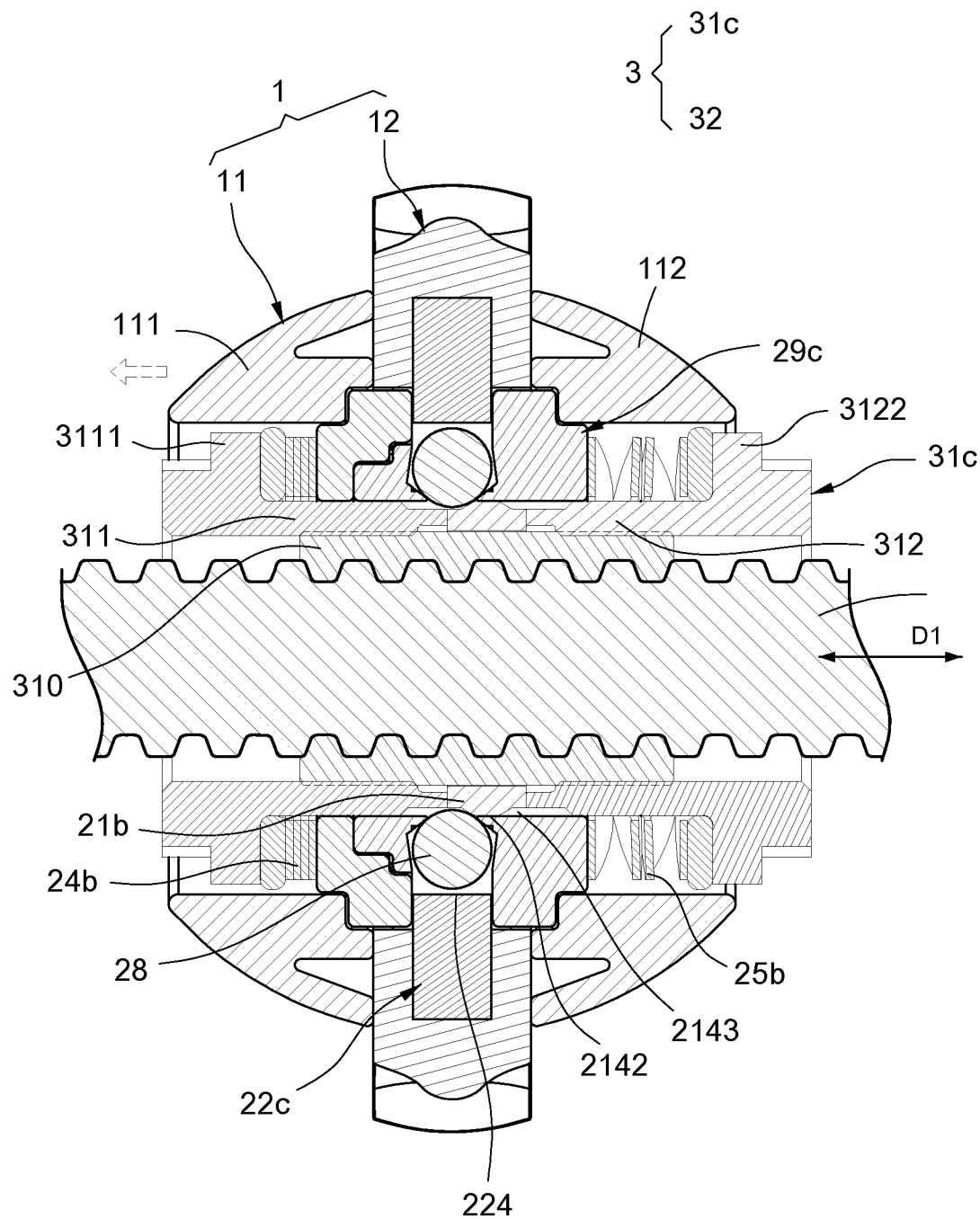
FIG. 24 is a cross-sectional view of the third embodiment of this disclosure in a released status when the swing member is applied an external force.
Figure 25:
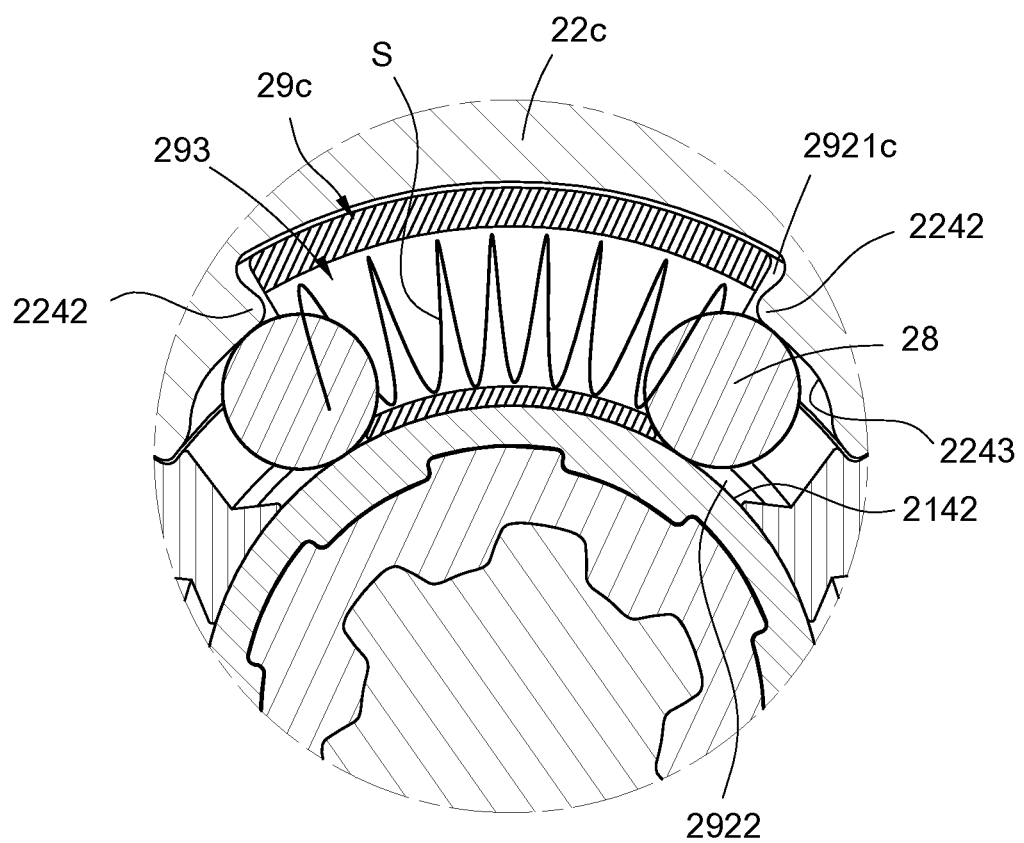
FIG. 25 is a cross-sectional view showing a part of elements of the third embodiment of this disclosure in a connected status.
Figure 26:
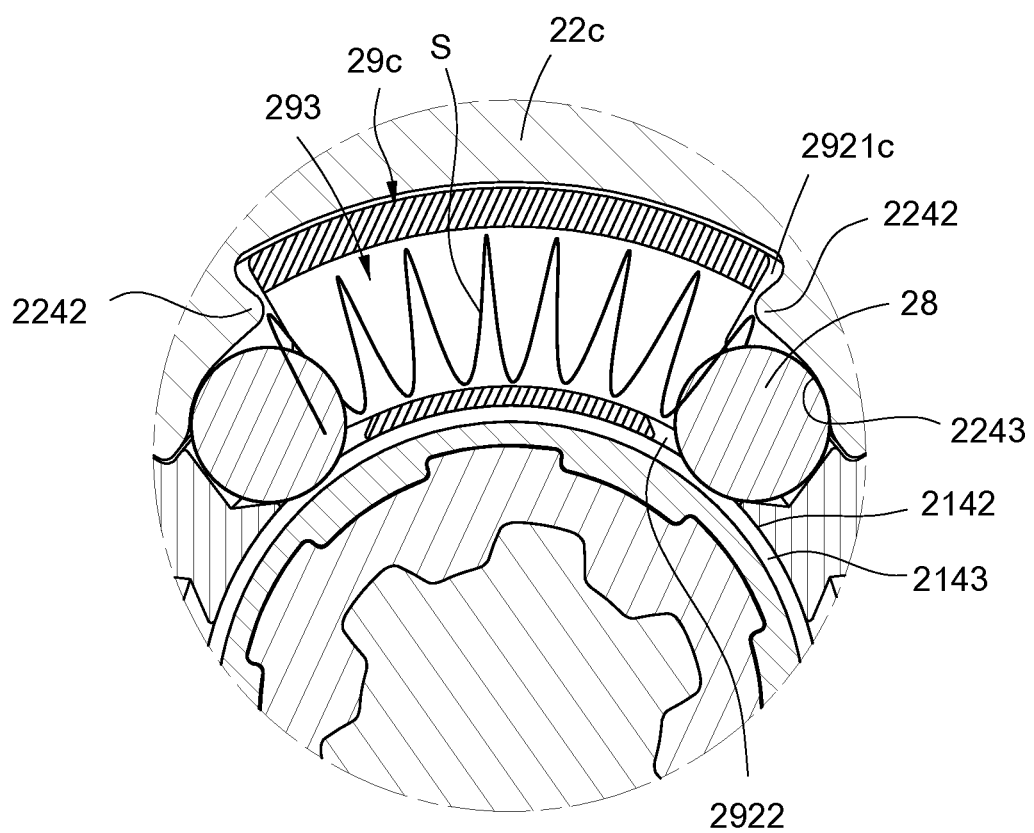
FIG. 26 is a cross-sectional view of the third embodiment of this disclosure in a released status.

Accordingly, as shown in FIGS. 23 and 25, when each roller 28 is correspondingly clamped between the engaging protrusion 2242 and the convex portion 2142, the nut 31c is engaged with the power transmission assembly 1. On the contrary, as shown in FIGS. 24 and 26, when the swing member O is driven by an external force to move the power transmission assembly 1 and the cage 29c and the engaging structure 224 along. The longitudinal direction D1, each roller 28 is moved along the longitudinal direction D1 with the cage 29c from the convex portion 2142 to a position between the releasing recess 2243 and the concave portion 2143, so that each roller 28 will not be clamped by the engaging structure 224, and then the power transmission assembly 1 is separated from the nut 31c.

In detail, as shown in FIGS. 23 and 24, the driving device 100 of this disclosure has a clutch assembly 2b. The clutch assembly 2b allows the swing member O to be driven to open or close by a driving power from the driving source 6 when the clutch assembly 2b is in the connected status; the driving power from the driving power source 6 is disconnected from the nut 31c when the clutch assembly 2b is in the released status. Accordingly, an external force (such as manual force) may be directly applied to the swing member O when the swing member O at any status (e.g. completely opened, completely closed, located at one location between the completely opened and completely closed positions or during a power-driven operation of opening of closing). For example, the swing member O can be stopped during a power-driven operation of opening of closing, but an operation the external force should not be limited to the embodiment in this disclosure. Moreover, the external force the power transmission assembly 1 or other mechanism components in the driving power source 6 cannot be reversely driven, because the driving power from the driving power source 6 is disconnected from the nut 31b so as to prevent the driving device 100 from damage caused by this, and a power-driven operation is allowed to be interrupted by a manual operation in any status. The clutch assembly 2b can be returned to the connected status from the released status by elastic recovery forces caused by the first elastic member 24b and the second elastic member 25b when the external force applied thereon is canceled. Accordingly, the nut 31a can engage to or release the power transmission assembly 1 when the screw assembly 3 is moved along the longitudinal direction D1 relative to the power transmission assembly 1 (to extend or retract). In other words, the third embodiment of the driving device 100 of this disclosure performs all the effects the same as the second embodiment.

In addition, compared with the second embodiment, in this embodiment, since the auxiliary elastic members S are accommodated in the through ways 293 respectively and each of the auxiliary elastic members is disposed between two of the rollers 28 adjacent to each other for elastically supporting, thereby stably holding the two rollers 28 adjacent to each other between the engaging protrusion 2242 and the convex portion 2142, namely that, as an example shown in FIG. 24, each rollers 28 is driven by the elastic forces caused by the auxiliary elastic members S to directly engage the engaging protrusion 2242 when the cage 29c is moved by the elastic force caused by the first elastic members 24b to a position corresponding to the engaging protrusions 2242.

In conclusion, the driving device 100 of this disclosure can achieve the predetermined purpose and effect to solve the issues of related art, and a patent application is therefore filed.

While this disclosure has been described by means of specific embodiments, numerous modifications and variations could be made thereto by those skilled in the art without departing from the scope and spirit of this disclosure set forth in the claims.

What is claimed is:

1. A driving device for driving a swing member, comprising:
   a driving power source;
   a power transmission assembly, driven by the driving power source;
   a screw assembly, comprising a nut and a screw rod screwed with each other, the screw rod defined with a longitudinal direction and a radial direction perpendicular to the longitudinal direction, the screw rod comprising an end for connecting to the swing member; and
   a clutch assembly, arranged between the power transmission assembly and the screw assembly, the nut being capable of connecting to or releasing the power transmission assembly along the radial direction via the clutch assembly;
   wherein the clutch assembly comprises a cage arranged in the power transmission assembly, a first elastic member and a second elastic member; the nut comprises a first extending segment and a second extending segment, the first extending segment comprises a first stopping portion, the second extending segment comprises a second stopping portion, the first elastic member sleeves the first extending segment, the second elastic member sleeves the second extending segment so that the first elastic member is disposed between the first stopping portion and one side of the cage for elastically supporting, and the second elastic member is disposed between the second stopping portion and another side of the cage for elastically supporting, the nut is driven by an elastic force caused by the first elastic member and the second elastic member to engage the power transmission assembly along the radial direction via the clutch assembly;
   wherein the power transmission assembly is driven by the driving power source when the nut is connected to the power transmission assembly, so that the nut is driven by the power transmission assembly to move the screw rod along the longitudinal direction.

2. The driving device according to claim 1, wherein in the screw assembly, the nut, the clutch assembly and the power transmission assembly are mutually interfered in the radial direction, so that the nut is engaged with the power transmission assembly.

3. The driving device according to claim 1, wherein in the screw assembly, the nut, the clutch assembly and the power transmission assembly overlap each other in the radial direction, so that the nut is engaged with the power transmission assembly.

4. The driving device according to claim 1, wherein the nut is configured for connecting to or releasing the power transmission assembly by moving the screw assembly relative to the power transmission assembly along the longitudinal direction.

5. The driving device according to claim 4, wherein the clutch assembly is defined with a connected status and a released status, when the nut is connected with the power transmission assembly, the clutch assembly is configured as the connected status so that the nut is driven by the power transmission assembly; when the power transmission assembly is released from the nut, the clutch assembly configured as the released status so that the nut is disconnected from the power transmission assembly.

6. The driving device according to claim 1, wherein the clutch assembly comprises a first addendum and dedendum structure and a second addendum and dedendum structure capable of engaging with each other, the first addendum and dedendum structure is configured to surround an external periphery of the nut, the second addendum and dedendum structure is disposed along an internal edge of the power transmission assembly, when the swing member is applied with an external force to move with the power transmission assembly and the second addendum and dedendum structure relative to the screw assembly along the longitudinal direction, the second addendum and dedendum structure is moved with the power transmission assembly along the longitudinal direction to deviate from the first addendum and dedendum structure, so that the power transmission assembly is separated from the nut; the first addendum and dedendum structure comprises a plurality of first tooth dedendums and a plurality of first tooth addendums, the first tooth addendums are disposed at intervals and protruded from the external periphery of the nut along the radial direction, each of first tooth dedendums is disposed between two of the first tooth addendums adjacent to each other; the second addendum and dedendum structure a plurality of second tooth dedendums and a plurality of second tooth addendums arranged on the internal edge of the power transmission assembly, the second tooth addendums are extended along the radial direction and into the first tooth dedendums respectively, the first tooth addendums are extended along the radial direction and into the second tooth dedendums respectively.

7. The driving device according to claim 1, wherein the clutch assembly further comprises a first bearing and a second bearing, the nut further comprises a nut body and the first extending segment and the second extending segment are respectively extended from two sides of the nut body, the first bearing and the second bearing are arranged on the first extending segment and the second extending segment respectively, the first elastic member comprises a first end abutting against the first bearing and the second elastic member comprises a second end abutting against the second bearing.

8. The driving device according to claim 1, wherein the clutch assembly comprises an interactive structure, an engaging structure and a plurality of rollers, the engaging structure is annually disposed on the internal edge of the power transmission assembly, the interactive structure is annually disposed on an external periphery of the nut and comprises a convex portion and at least one concave portion dented relative to the convex portion, the rollers are disposed between the engaging structure and the interactive structure.

9. The driving device according to claim 8, wherein the cage comprises a plurality of accommodating holes, the rollers are respectively accommodated in the accommodating holes and are configured to be moveable, each of the accommodating holes comprises an opening and a convergent opening, the engaging structure surrounds the rollers, each of the rollers comprises one portion, the portions are exposed through the openings respectively and disposed toward the engaging structure, each of the rollers comprises an other portion, the other portions are exposed through the convergent opening and disposed toward the interactive structure.

10. The driving device according to claim 9, wherein the nut comprises a nut body and the first extending segment and the second extending segment are respectively extended from two sides of the nut body.

11. The driving device according to claim 8, wherein when the rollers are engaged between the engaging structure and convex portion, the nut is connected to the power transmission assembly.

12. The driving device according to claim 8, wherein when the swing member is applied with an external force to move with the power transmission assembly and the engaging structure along the longitudinal direction, the rollers are moved with the power transmission assembly along the longitudinal direction from the convex portion to the at least one concave portion, so that the power transmission assembly is released from the nut.

13. The driving device according to claim 8, wherein the clutch assembly further comprises an engaging ring, the engaging ring is arranged on the power transmission assembly and the engaging ring comprises an engaging structure.

14. The driving device according to claim 13, wherein the power transmission assembly comprises a ring gear, the power transmission assembly is meshed with the driving power source through the ring gear, the cage is disposed between the power transmission assembly and the nut and the cage comprises a surrounding groove, the engaging ring comprises a portion disposed in the surrounding groove.

15. The driving device according to claim 14, wherein the engaging ring comprises at least one latching structure protruding along the radial direction, the ring gear comprises at least one counterpart latching structure, the counterpart latching structure is engaged with the latching structure.

16. The driving device according to claim 8, wherein the nut comprises an outer peripheral surface, the interactive structure surrounds the outer peripheral surface of the nut, the convex portion is protruded from one portion of the outer peripheral surface along the radial direction, the at least one concave portion is defined between the convex portion and another portion of the outer peripheral surface.

17. The driving device according to claim 16, wherein the interactive structure and the nut are formed as one piece.

18. The driving device according to claim 16, wherein the convex portion and the at least one concave portion are disposed side by side along the longitudinal direction.

19. The driving device according to claim 8, wherein the clutch assembly further comprises a plurality of auxiliary elastic members, each of the auxiliary elastic members supports between two of the rollers adjacent to each other with an elastic force.

20. The driving device according to claim 19, wherein the engaging structure comprises a plurality of engaging blocks annually disposed, each of the engaging blocks comprises two engaging protrusions and a releasing recess dented relative to the engaging protrusions, the releasing recess is disposed between the two engaging protrusions, each of the rollers engages between the convex portion and the engaging protrusion of one of the engaging blocks.

21. The driving device according to claim 20, wherein when the rollers are engaged between the engaging protrusions and the convex portions respectively, the nut is connected with the power transmission assembly.

22. The driving device according to claim 20, wherein when the swing member is applied with an external force to move with the power transmission assembly and the engaging structure along the longitudinal direction, the rollers are moved with the power transmission assembly along the longitudinal direction from the convex portion to a position between the releasing recess and the at lease one concave portion, so that the power transmission assembly is released from the nut.

23. The driving device according to claim 19, wherein the cage comprises a plurality of accommodating holes and a plurality of through ways, each of the through ways is communicated between two of the accommodating holes adjacent to each other, the rollers are respectively accommodated in the accommodating holes are configured to be moveable, the auxiliary elastic members are respectively accommodated in the through ways and each of the auxiliary elastic members support between two of the rollers adjacent to each other with the elastic force, each of the accommodating holes comprises a notch and a convergent opening, the engaging structure is configured to surround the roller extended into the notches respectively to contact the rollers, each of the rollers comprises a portion exposed toward the interactive structure through the convergent opening.

24. The driving device according to claim 19, wherein the clutch assembly further comprises an engaging ring, the engaging ring is disposed at the power transmission assembly and the engaging ring comprises an engaging structure.

25. The driving device according to claim 1, wherein the driving power source comprises a driving body and a driving gear, the driving gear is driven by the driving body to rotate, the power transmission assembly is driven to rotate by the driving body through the driving gear; the driving power source further comprises a worm gear, the worm gear and the driving gear are co-axial, the driving body comprises a driving shaft, the driving shaft comprises a spiral thread protruding from an external periphery thereof, the spiral thread is meshed with the worm gear.

26. The driving device according to claim 1, further comprising a housing, the housing comprising a limiting portion, the power transmission assembly arranged at the limiting portion and configured to be rotatable.

27. The driving device according to claim 26, wherein the housing further comprises a first bushing and a second bushing arranged on the limiting portion, the power transmission assembly is a sphere, the power transmission assembly is disposed between the first bushing and the second bushing so as to be rotatable relative to the housing, when the screw rod is rotated about the power transmission assembly to cause an angular variation relative to the longitudinal direction, the power transmission assembly is rotated with the angular variation of the screw rod.

28. The driving device according to claim 27, wherein the power transmission assembly comprises a first hemispherical structure and a second hemispherical structure at two sides thereof, the first hemispherical structure is contacted with the first bushing and the second hemispherical structure is contacted with the second bushing.

29. The driving device according to claim 26, wherein the power transmission assembly comprises a ring gear, a plurality of driven teeth are arranged on an outer periphery of the ring gear, when the power transmission assembly is rotated, the power transmission assembly is meshed with the driving power source through the driven teeth and configured to be swingable.

30. The driving device according to claim 29, wherein the power transmission assembly further comprises a first hemispherical structure and a second hemispherical structure, the first hemispherical structure and the second hemispherical structure are disposed at two sides of the ring gear respectively.

31. The driving device according to claim 29, wherein the driven teeth are arranged on an outer periphery of the power transmission assembly along the longitudinal direction.

32. The driving device according to claim 29, wherein each of the driven teeth comprises two end portions on the longitudinal direction, each end portion is of a converged shape along a direction from the outer periphery of the power transmission assembly away from the outer periphery of the power transmission assembly.

33. The driving device according to claim 29, wherein each of the driven teeth comprises an outer edge away from the outer periphery of the power transmission assembly, the outer edge is of an arc shape.

34. A driving device used for driving a swing member, the driving device comprising:
a driving power source;
a power transmission assembly, driven by the driving power source;
a screw assembly, comprising a nut and a screw rod screwed with each other, the screw rod being defined with a longitudinal direction and a radial direction perpendicular to the longitudinal direction, the screw rod comprising one end for connecting to the swing member; and
a clutch assembly, arranged between the power transmission assembly and the screw assembly, the nut being operated by the clutch assembly to connect to or release the power transmission assembly along the radial direction;
wherein the clutch assembly comprises a cage arranged in the power transmission assembly, a first elastic member and a second elastic member; the nut comprises a first extending segment and a second extending segment, the first extending segment comprises a first stopping portion, the second extending segment comprises a second stopping portion, the first elastic member sleeves the first extending segment, the second elastic member sleeves the second extending segment so that the first elastic member is disposed between the first stopping portion and one side of the cage for elastically supporting, and the second elastic member is disposed between the second stopping portion and another side of the cage for elastically supporting, the nut is driven by an elastic force caused by the first elastic member and the second elastic member to engage the power transmission assembly along the radial direction via the clutch assembly;
wherein, in the screw assembly, the nut, the clutch assembly and the power transmission assembly are mutually interfered with each other in the radial direction, so that the nut is engaged with the power transmission assembly, the power transmission assembly is driven by the driving power source when the nut is connected with the power transmission assembly, so that the nut is driven by the power transmission assembly to move the screw rod along the longitudinal direction.

35. A driving device used for driving a swing member, the driving device comprising:
a driving power source;
a power transmission assembly, driven by the driving power source;
a screw assembly, comprising a nut and a screw rod screwed with each other, the screw rod defined with a longitudinal direction and a radial direction perpendicular to the longitudinal direction, the screw rod comprising a one end for connecting to the swing member; and
a clutch assembly, arranged between the power transmission assembly and the screw assembly, the nut being operated by the clutch assembly to connect to or release the power transmission assembly along the radial direction;
wherein the clutch assembly comprises a cage arranged in the power transmission assembly, a first elastic member and a second elastic member; the nut comprises a first extending segment and a second extending segment, the first extending segment comprises a first stopping portion, the second extending segment comprises a second stopping portion, the first elastic member sleeves the first extending segment, the second elastic member sleeves the second extending segment so that the first elastic member is disposed between the first stopping portion and one side of the cage for elastically supporting, and the second elastic member is disposed between the second stopping portion and another side of the cage for elastically supporting, the nut is driven by an elastic force caused by the first elastic member and the second elastic member to engage the power transmission assembly along the radial direction via the clutch assembly;

wherein in the screw assembly, the nut, the clutch assembly and the power transmission assembly overlap each other in the radial direction, so that the nut is engaged with the power transmission assembly, the power transmission assembly is driven by the driving power source when the nut is connected with the power transmission assembly, so that the nut is driven by the power transmission assembly to move the screw rod along the longitudinal direction.

36. A driving device used for driving a swing member, the driving device comprising:
   a driving power source;
   a power transmission assembly, driven by the driving power source;
   a screw assembly, comprising a nut and a screw rod screwed with each other, the screw rod defined with a longitudinal direction and a radial direction perpendicular to the longitudinal direction, the screw rod comprising a one end for connecting to the swing member; and
   a clutch assembly, arranged between the power transmission assembly and the screw assembly, the nut being operated by the clutch assembly to connect to or release the power transmission assembly along the radial direction; wherein in the nut can connect to or release the power transmission assembly by moving the screw assembly relative to the power transmission assembly along the longitudinal direction, the power transmission assembly is driven by the driving power source when the nut is connected with the power transmission assembly, so that the nut is driven by the power transmission assembly to move the screw rod along the longitudinal direction;
   wherein the clutch assembly comprises a cage arranged in the power transmission assembly, a first elastic member and a second elastic member; the nut comprises a first extending segment and a second extending segment, the first extending segment comprises a first stopping portion, the second extending segment comprises a second stopping portion, the first elastic member sleeves the first extending segment, the second elastic member sleeves the second extending segment so that the first elastic member is disposed between the first stopping portion and one side of the cage for elastically supporting, and the second elastic member is disposed between the second stopping portion and another side of the cage for elastically supporting, the nut is driven by an elastic force caused by the first elastic member and the second elastic member to engage the power transmission assembly along the radial direction via the clutch assembly.

37. The driving device according to claim 36, wherein the clutch assembly is defined with a connected status and a released status, when the nut is connected with the power transmission assembly, the clutch assembly is configured as the connected status so that the nut is driven by the power transmission assembly; when the power transmission assembly is released from the nut, the clutch assembly configured as the released status so that the nut is disconnected from the power transmission assembly.

38. The driving device according to claim 8, wherein the convex portion and the at least one concave portion are disposed side by side along the longitudinal direction.

* * * * *